(12) United States Patent
Santi et al.

(10) Patent No.: US 10,346,660 B2
(45) Date of Patent: Jul. 9, 2019

(54) CODED IMAGE CAPTURE AND DECODING SYSTEM

(71) Applicant: Datalogic IP Tech S.r.l., Bologna (IT)

(72) Inventors: Stefano Santi, Eugene, OR (US); Lorenzo Vorabbi, Rimini (IT)

(73) Assignee: Datalogic I.P. Tech S.R.L., Bologna (IT)

( * ) Notice: Subject to any disclaimer, the term of this patent is extended or adjusted under 35 U.S.C. 154(b) by 57 days.

(21) Appl. No.: 15/686,614

(22) Filed: Aug. 25, 2017

(65) Prior Publication Data
US 2019/0065799 A1    Feb. 28, 2019

(51) Int. Cl.
| | | |
|---|---|---|
| *G06T 7/11* | (2017.01) | |
| *G06K 7/14* | (2006.01) | |
| *G06K 7/10* | (2006.01) | |
| *G06K 19/06* | (2006.01) | |
| *G06K 9/20* | (2006.01) | |

(52) U.S. Cl.
CPC ....... *G06K 7/1417* (2013.01); *G06K 7/10722* (2013.01); *G06K 7/1413* (2013.01); *G06K 7/1443* (2013.01); *G06K 9/2054* (2013.01); *G06K 19/06028* (2013.01); *G06K 19/06037* (2013.01); *G06T 7/11* (2017.01)

(58) Field of Classification Search
CPC .. G06K 7/1404; G06K 7/1413; G06K 7/1417; G06K 7/1439; G06K 7/1443; G06K 7/1447; G06K 9/2054; G06T 7/11
See application file for complete search history.

(56) References Cited

U.S. PATENT DOCUMENTS

| | | | | |
|---|---|---|---|---|
| 6,047,893 A | * | 4/2000 | Saporetti | G06K 7/14 235/462.08 |
| 6,729,544 B2 | * | 5/2004 | Navon | G06K 7/14 209/584 |
| 6,738,496 B1 | * | 5/2004 | Van Hall | G06K 9/38 382/101 |
| 9,008,426 B2 | | 4/2015 | Schuler et al. | |
| 10,078,774 B1 | * | 9/2018 | Vorabbi | G06K 7/1443 |
| 2002/0162889 A1 | | 11/2002 | Navon | |
| 2007/0084928 A1 | | 4/2007 | Ackley | |
| 2015/0090791 A1 | | 4/2015 | Zhang et al. | |

OTHER PUBLICATIONS

European Search Report for EP application 18190632.2, dated Jan. 25, 2019 (5 pages).

* cited by examiner

*Primary Examiner* — Suezu Ellis
(74) *Attorney, Agent, or Firm* — The Juhasz Law Firm

(57) ABSTRACT

A decoding device includes decoding storage to store metadata of tiles of a captured image of an object, wherein each tile includes a 2D array of pixels, and the metadata is derived by a subsampling circuit from the captured image via transform and describes at least one characteristic of each tile. The decoding device also includes a processor to compare a metadata value of each tile to a first threshold to identify tiles that includes a portion of an indicia; upon identification of a cluster of adjacent tiles that each meet the first threshold and that are numerous enough to meet a second threshold, request a ROI that includes the cluster from a subsampling circuit; analyze the ROI to determine whether it contains the indicia; and decode and transmit data encoded within the indicia to a server.

26 Claims, 12 Drawing Sheets

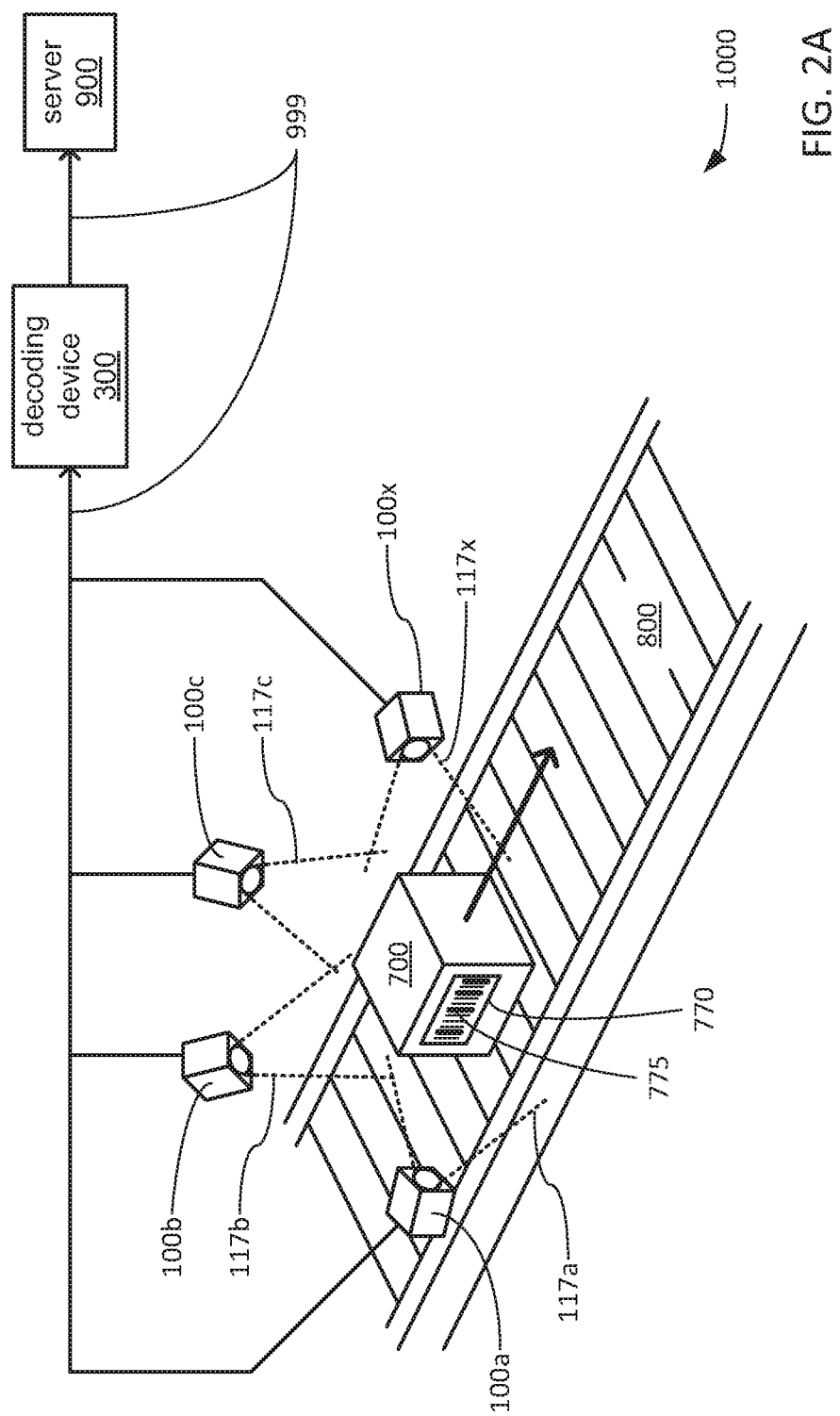

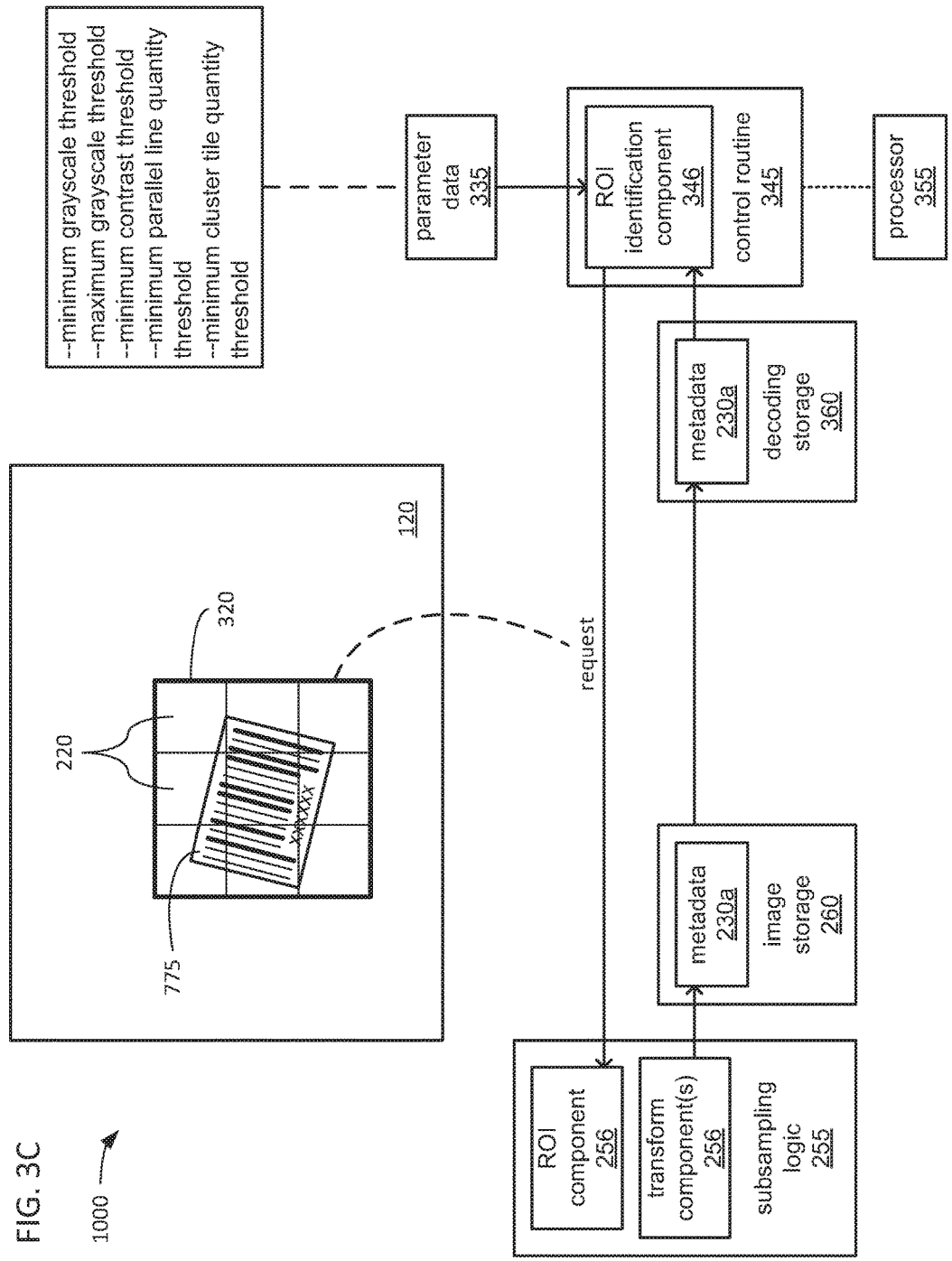

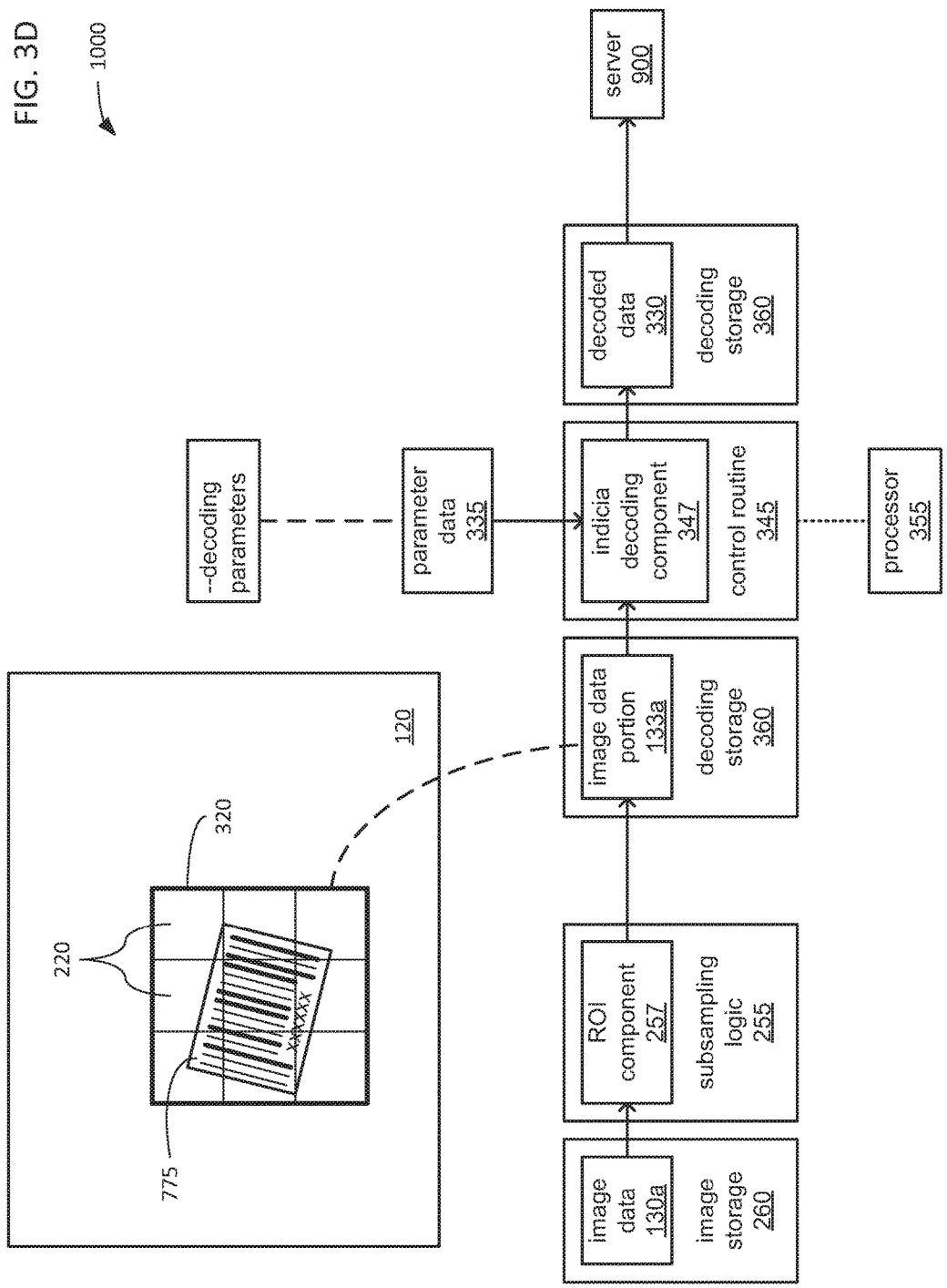

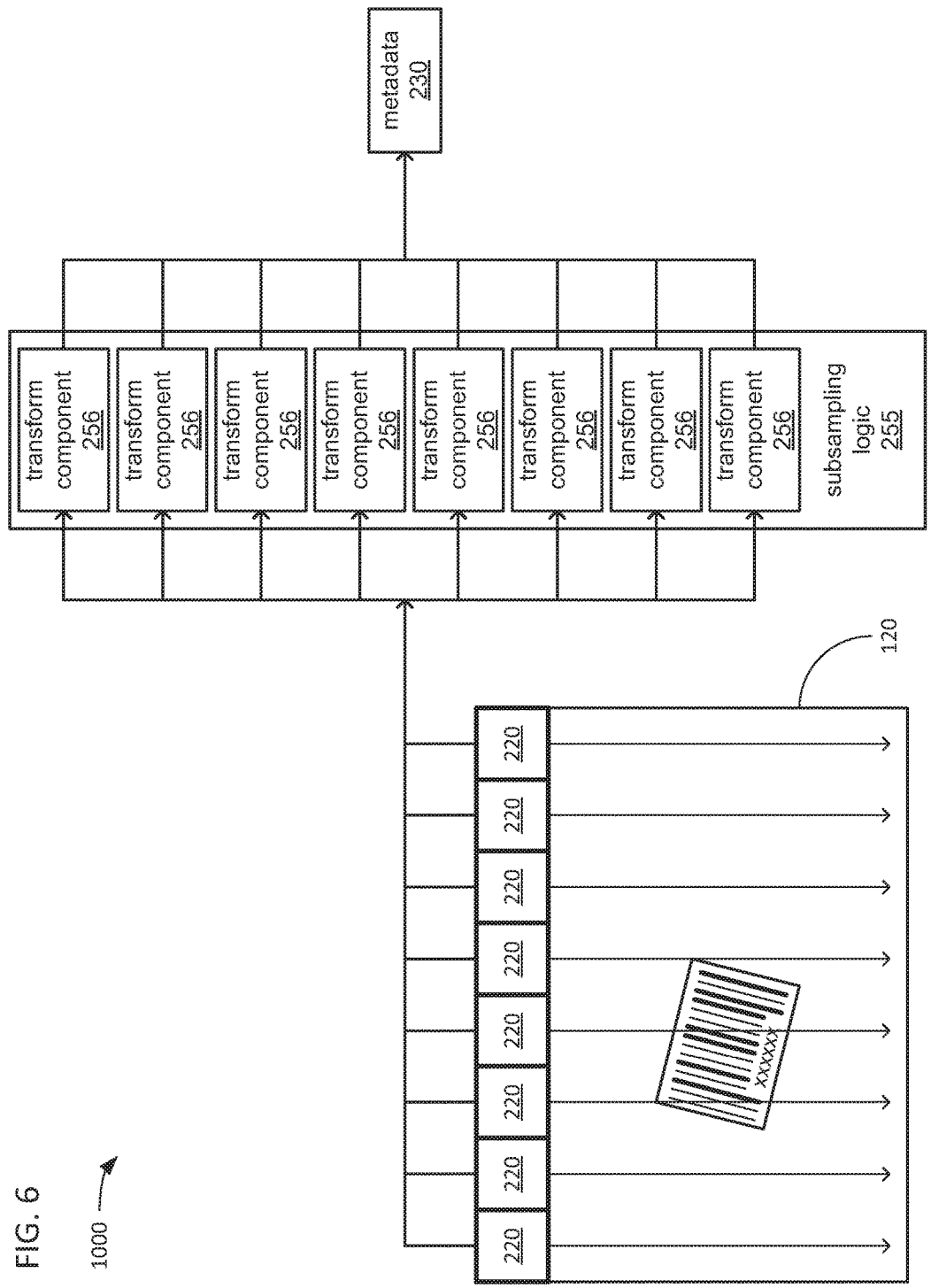

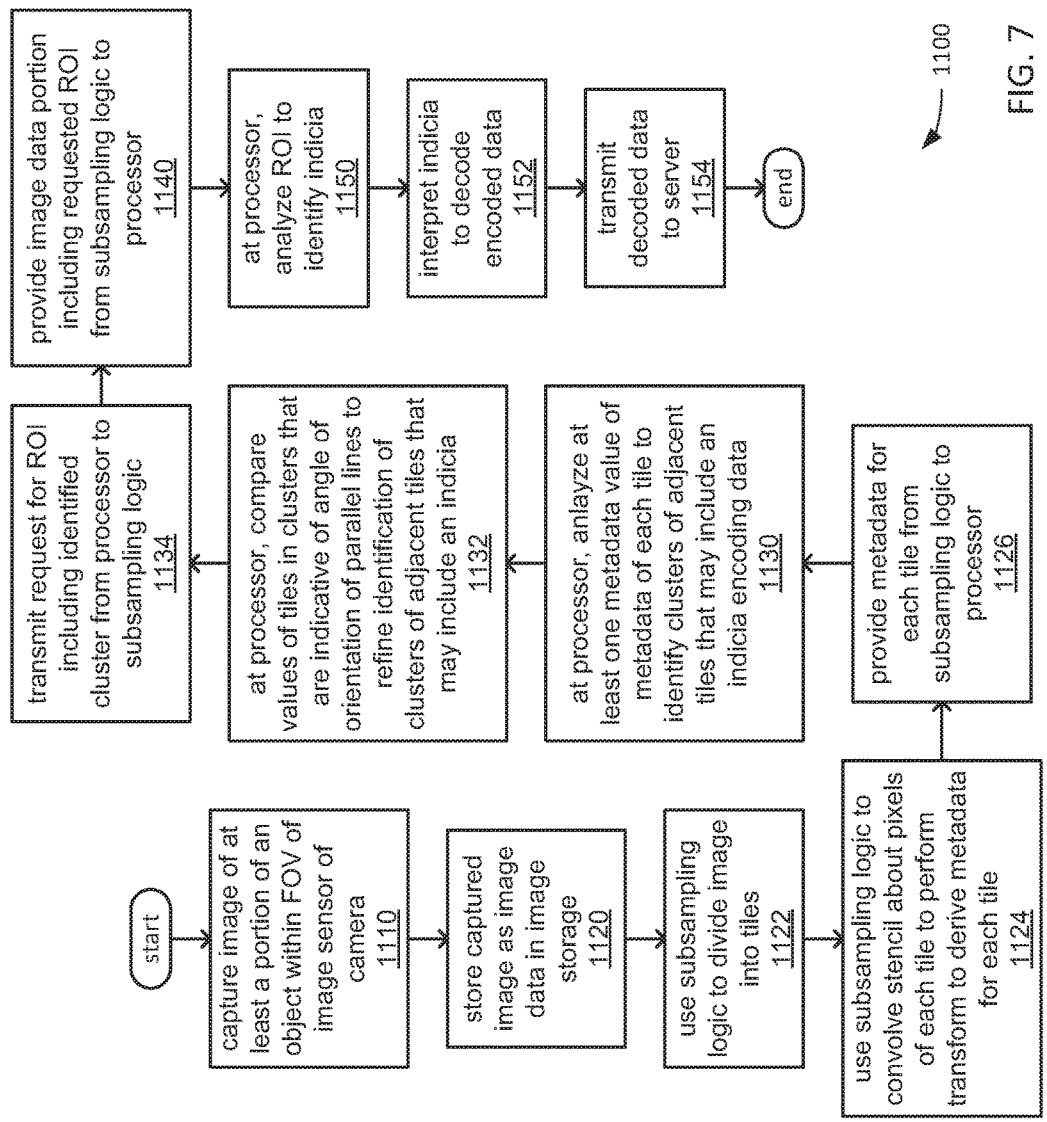

CODED IMAGE CAPTURE AND DECODING SYSTEM

RELATED APPLICATIONS

This application is related to the following applications, the contents of which are hereby incorporated by reference in their entirety: application Ser. No. 15/686,671 entitled "SIMD-BASED SYSTEM FOR MULTIPLE DECODE OF CAPTURED IMAGES," now U.S. Pat. No. 10,078,774, filed concurrently herewith by Lorenzo Vorabbi and Stefano Santi.

BACKGROUND OF THE INVENTION

1. Field of the Invention

The present invention relates to systems for capturing and decoding indicia that encode data.

2. Description of the Related Art

The application of indicia, such as a barcode and quick response (QR) codes, to surfaces of objects for subsequent capture and decoding is well known. Also well known is the use of a set of multiple stationary cameras to simultaneously capture images of multiple surfaces of such objects in an effort to capture images of such indicia for decoding.

Such a set of stationary cameras may be positioned about a location at which objects bearing such indicia may be placed and/or through which such objects may be transported. By way of example, multiple ones of such cameras may be positioned to place a portion of the interior of a warehouse within the field of view (FOV) of each camera to enable the capture of an indicia carried on a surface of an object (e.g., a box, a crate, a palletized load, etc.) as the object is transported into the warehouse, is stored within the portion of the warehouse, and/or is transported out of the warehouse.

As will be familiar to those skilled in the art, searching through captured images to identify such indicia and interpreting such indicia to decode the data encoded therein are typically processing-intensive tasks. As a result, it has become commonplace to incorporate a separate processor (e.g., a central processing unit, or CPU) into each one of the multiple cameras that may be so positioned to perform such tasks separately for each camera.

However, such dedication of a separate processor to the processing of images captured by each separate camera can make the installation of such a set of cameras prohibitively expensive, thereby preventing the benefits of the use of a set of cameras from being realized. Also, since it is a commonplace practice to apply only one of such indicia to an object, it is frequently the case that only one camera of a set of cameras actually captures an image of an indicia for each object that is brought into FOVs of the set of cameras. As a result, while the processing resources of all of the processors may be utilized to search through the images captured by corresponding ones of the cameras to identify an indicia, it is typically the case that the processing resources of only one of the processors is then utilized to decode the indicia carried by an object after the indicia has been identified. Thus, it is frequently the case that the available processing resources of all but one of multiple processors are entirely wasted.

Thus, a system able to make more efficient use of reduced processing resources is needed.

SUMMARY OF THE INVENTION

Technologies are described for making more efficient use of reduced processing resources in identifying and interpreting indicia in multiple images of objects captured by a set of cameras.

A decoding device may include a decoding storage configured to store metadata of each tile of an image of a portion of an object captured by an image sensor of a camera, wherein: the image is divided by a subsampling circuit associated with the camera into multiple tiles, each tile comprises a two-dimensional (2D) array of pixels of a portion of the image, the metadata of each tile is derived by the subsampling circuit from a performance of a transform with grayscale values of the 2D array of pixels, and the metadata is descriptive of at least one characteristic of at least a portion of the 2D array of pixels. The decoding device may also include a processor coupled to the decoding storage, the processor configured to, for each tile of the image, compare a metadata value of the corresponding metadata to a first threshold to identify at least one tile of the image that comprises a portion of an indicia that encodes data. The processor may also be configured to, in response to an identification of a cluster of adjacent tiles of the image in which the metadata value of each tile of the cluster meets the first threshold, and in which the cluster comprises a quantity of tiles that meets a second threshold: transmit a request to the subsampling circuit to provide a region of interest (ROI) of the image that comprises the cluster; analyze the ROI to determine whether the ROI contains the indicia; and in response to a determination that the ROI contains the indicia, interpret the indicia to decode the encoded data and transmit the decoded data to a server via a network.

A decoding system may include a camera that comprises an image sensor configured to capture an image of a portion of an object, and a subsampling circuit coupled to the image sensor. The subsampling circuit may be configured to: divide the image into multiple tiles, wherein each tile comprises a two-dimensional (2D) array of pixels of a portion of the image, and for each tile of the image, perform a transform with grayscale values of the 2D array of pixels to derive metadata descriptive of at least one characteristic of at least a portion of the 2D array of pixels. The decoding system may also include a processor coupled to the subsampling circuit, and the processor may be configured to, for each tile of the image, compare a metadata value of the corresponding metadata to a first threshold to identify at least one tile of the image that comprises a portion of an indicia that encodes data. The processor may also be configured to, in response to an identification of a cluster of adjacent tiles of the image in which the metadata value of each tile of the cluster meets the first threshold, and in which the cluster comprises a quantity of tiles that meets a second threshold: transmit a request to the subsampling circuit to provide a region of interest (ROI) of the image that comprises the cluster; analyze the ROI to determine whether the ROI contains the indicia; and in response to a determination that the ROI contains the indicia, interpret the indicia to decode the encoded data and transmit the decoded data to a server via a network.

BRIEF DESCRIPTION OF THE DRAWINGS

FIGS. 2A and 2B, together, show aspects of an example use of an example implementation of the system of either of FIG. 1A or 1B.

FIGS. 3A, 3B, 3C and 3D, together, show aspects of an internal architecture associated with a single camera of the system of either of FIG. 1A or 1B.

FIG. 6 shows aspects of parallel performances of a transform within the system of either of FIG. 1A or 1B.

FIG. 7 shows aspects of the operation of the system of either of FIG. 1A or 1B.

DETAILED DESCRIPTION OF THE INVENTION

Figure 1A:
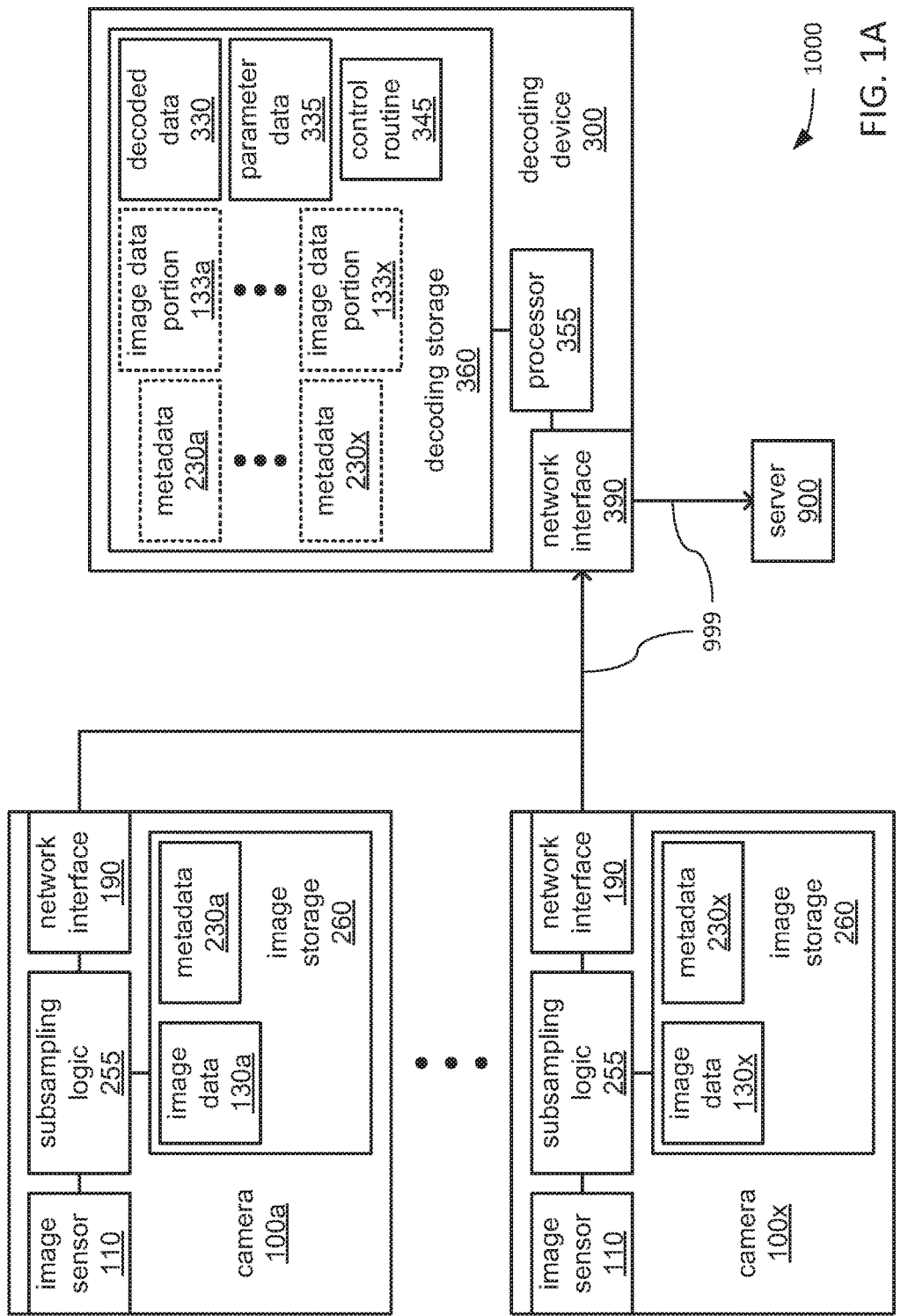
FIGS. 1A and 1B show aspects of alternate implementations of an indicia decoding system.

This detailed disclosure further incorporates by reference the disclosure provided in application Ser. No. 15/686,671 entitled "SIMD-BASED SYSTEM FOR MULTIPLE DECODE OF CAPTURED IMAGES," now U.S. Pat. No. 10,078,774, filed concurrently herewith by Lorenzo Vorabbi and Stefano Santi.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is an indicia decoding system to identify and decode an indicia that encodes data included within one or more images of an object captured by one or more cameras of a set of cameras. Generally, the indicia decoding system may include a plurality of cameras that are each configured to capture images of portions of an object that may carry an indicia. Each of the cameras may be associated with and coupled to a separate subsampling logic configured to divide an image captured by its associated one of the cameras into tiles that are each defined by a two-dimensional (2D) array of pixels of the image, and to perform a transform on each tile to derive metadata descriptive of at least one characteristic of the tile.

The indicia decoding system may also include a decoding device that includes a processor configured to analyze the at least one characteristic described by the metadata for each tile of the image to identify at least one cluster of adjacent tiles of sufficient quantity in at least one of the images that may include such indicia. In response to identifying such a cluster, the processor may also be configured to transmit a request for a region of interest (ROI) within the image that includes the cluster to the subsampling logic that provided the processor with the metadata for the tiles of the cluster. Upon receiving the requested ROI, the processor may be further configured to analyze the ROI to determine whether such indicia is included therein. In response to a determination that such indicia is included within the ROI, the processor may be still further configured to interpret the indicia to decode the data encoded therein, and to transmit the decoded data to another device, such as a server for use in monitoring the presence of, location of, and/or other aspects of objects to which such indicia is applied.

Figure 1B:
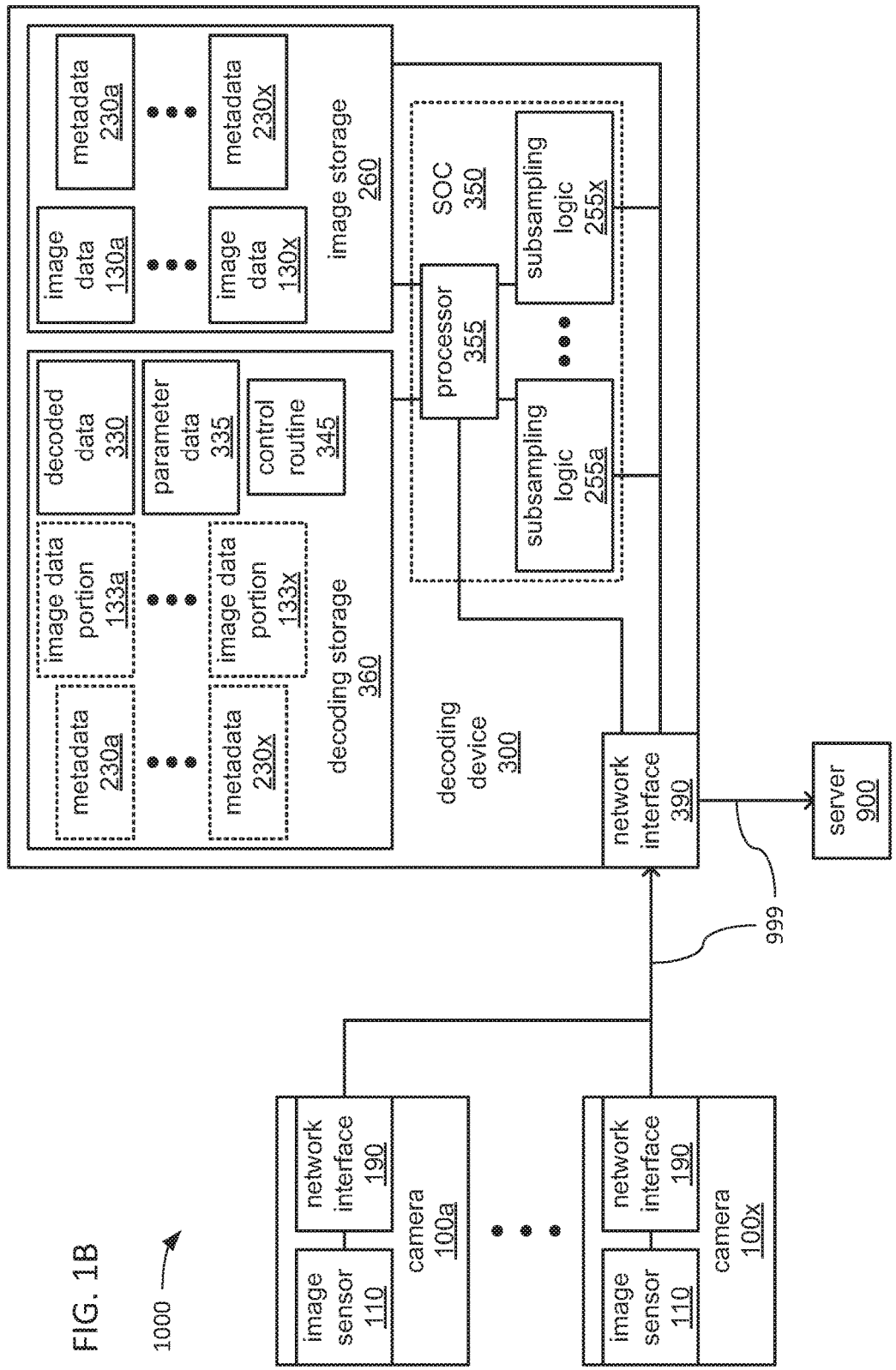

FIGS. 1A and 1B depict aspects of alternate example embodiments of an indicia decoding system 1000 that may include a plurality of cameras 100a-x and a decoding device 300 coupled by a network 999 (e.g., the cable-based and/or wireless links interconnecting devices). In the decoding systems 1000 depicted in each of FIGS. 1A and 1B, and as will be explained in greater detail, the cameras 100a-x and the decoding device 300 may cooperate through the network 999 to capture and decode images of indicia encoding data that are carried on the surfaces of objects. Following such decoding, the decoding device 300 may further transmit the decoded data to another device, such as the depicted example server 900.

Turning more specifically to the illustrative implementation of FIG. 1A, each of the cameras 100a-x may include an image sensor 110, a subsampling logic 255, an image storage 260, and a network interface 190 to couple each of the cameras 100a-x to the network 999. The image storage 260 of each of the cameras 100a-x may store a corresponding one of image data 130a-x and/or a corresponding one of metadata 230a-x. Within each of the cameras 100a-x, the image sensor 110, the image storage 260 and the network interface 190 may each be communicatively coupled to the subsampling logic 255 to exchange data therewith through the exchange of electrical, optical, magnetic and/or other signals through one or more buses and/or other form of interconnect.

The image sensor 110 within each of the cameras 110a-x may capture one or more images within its field of view and provide the captured one or more images to the subsampling logic 255. The subsampling logic 255 may incorporate hardware-based logic (e.g., transistor logic, gate logic, reprogrammable gate array logic, etc.) to implement various functions. More specifically, the subsampling logic 255 may serve as a storage controller to control operation of the image storage 260, and may store images captured by the image sensor 110 within the image storage 260 as a corresponding one of the image data 130a-x. In some embodiments, the subsampling logic 255 may recurringly update the corresponding one of the image data 130a-x to include a predetermined quantity of the images most recently captured by the image sensor, and therefore, may recurringly remove less recently captured images therefrom. The subsampling logic 255 may also divide each of the images captured by the image sensor 110 into tiles and then perform a transform, per tile, to generate one or more metadata values that the sampling logic 255 may store within the image storage 260 as a corresponding one of the metadata 230a-x. The subsampling logic 255 may further operate the network interface 190 to transmit the corresponding one of the metadata 230a-x via the network 999 to the decoding device 300.

The decoding device 300 may include at least one processor 355, a decoding storage 360, and a network interface 390 to couple the decoding device 300 to the network 999. The decoding storage 360 may store one or more image data portions 133a-x, one or more of the metadata 230a-x, a control routine 345, parameter data 335 and/or decoded data 330. Within the decoding device 300, the decoding storage 360 and the network interface 390 may each be communicatively coupled to the processor 355 to exchange data therewith through the exchange of electrical, optical, magnetic and/or other signals through one or more buses and/or other form of interconnect.

The control routine 345 may incorporate a sequence of instructions operative on the processor 355 to implement logic to perform various functions. The processor 355 may operate the decoding storage 360 to retrieve the instructions of the control routine 345 for execution by the processor 355. In so doing, the processor 355 may be caused to operate the network interface 390 to receive one or more of the metadata 230a-x, and may operate the decoding storage 360 to store the received one or more of the metadata 230a-x therein. The processor 355 may also be caused to analyze at least one metadata value for each tile within each of the received and stored metadata 230a-x, based on one or more parameters retrieved from the parameter data 335, to identify a cluster of adjacent tiles of sufficient quantity within at least one of the images captured by the image sensor 110 of at least one of the cameras 100a-x that may include an indicia. In response to identifying such a cluster, the processor 355 may be caused to operate the network interface 390 to transmit, via the network 999 to the one of the cameras 100a-x that captured the image that includes the cluster of tiles, a request for a ROI within that image that includes the cluster.

Within the one of the cameras 100a-x that receives the request for the ROI, the subsampling logic 255 may respond to the receipt of the request by retrieving a portion of the corresponding one of the image data 130a-x that includes the ROI from the image storage 260 and operating the network interface 190 to transmit the retrieved portion to the decoding device 300 via the network 999. In embodiments in which the subsampling logic 255 maintains no more than a predetermined quantity of the images most recently captured by the image sensor 110 within the corresponding one of the image data 130a-x, the predetermined quantity may be selected to be large enough to ensure that any image associated with such a request for a ROI is caused to remain available long enough to so provide the requested ROI in response.

In response to receiving the ROI from the one of the cameras 100a-x to which the processor 355 transmitted the request, the processor 355 may store the received ROI as a corresponding one of the image data portions 133a-x within the decoding storage 360. The processor 355 may then be caused by further execution of the instructions of the control routine 345 to analyze the received ROI, based on one or more parameters retrieved from the parameter data 335, to determine whether an indicia is present within the ROI. If the processor 355 determines that there is an indicia within the received ROI, then the processor 355 may interpret the indicia to decode the data encoded therein (e.g., an identifier of the object to which the indicia is applied, a tracking number employed in transporting the object, etc.), which the processor 355 may store within the decoding storage 360 as the decoded data 330. The processor 355 may then operate the network interface 390 to transmit the decoded data 330 to another device (e.g., the depicted server 900) via the network 999.

As just discussed and as depicted in FIG. 1A, embodiments of the decoding system 1000 are possible in which each of the cameras 100a-x incorporates a subsampling logic 255 and an image storage 260 to enable the division of images into tiles and the performance of a transform with each tile to occur within each of the cameras 100a-x. However, and as depicted in FIG. 1B, other embodiments of the decoding system 1000 are possible in which the decode device 300 incorporates subsampling logic 255a-x corresponding to the cameras 100a-x and an image storage 260 to enable the division of images into tiles and the performance of a transform with each tile to occur within the decoding device 300.

Thus, and turning more specifically to the illustrative implementation of FIG. 1B, each of the cameras 100a-x may include an image sensor 110 and a network interface 190 to couple each of the cameras 100a-x to the network 999. Within each of the cameras 100a-x, the image sensor 110 may be communicatively coupled to the subsampling logic 255 to exchange data therewith through the exchange of electrical, optical, magnetic and/or other signals through one or more buses and/or other form of interconnect. The image sensor 110 within each of the cameras 110a-x may capture one or more images within its field of view and provide the captured one or more images to the network interface 190 to transmit to the decoding device 300 via the network 999.

The decoding device 300 may include subsampling logic 255a-x to correspond to the cameras 100a-x, and a single image storage 260, in addition to including at least the one processor 355, the decoding storage 360 and the network interface 390. The image storage 260 may store the image data 130a-x and/or the metadata 230a-x, also to correspond to the cameras 100a-x. Within the decoding device 300, each of the subsampling logic 255a-x and the image storage 260 may be communicatively coupled to the processor 355 to exchange data therewith, in addition to the decoding storage 360 and the network interface 390.

In some embodiments, and as depicted with dotted lines, the processor 355 and the subsampling logic 255a-x may be incorporated into a single integrated circuit (or a single multi-chip package), such as a system on chip (SOC) 350. By way of example, the SOC 350 may incorporate the processor 355 and one or more programmable arrays of gate logic that may be programmed to implement the subsampling logic 255a-x. In such embodiments, the image storage 260, the decoding storage 360 and the network interface 390 may be communicatively coupled to the SOC 350. The SOC 350 may either incorporate one or more storage controllers by which the image storage 260 and/or the decoding storage 360 may be coupled to the SOC 350, and/or may one or more programmable arrays of gate logic incorporated into the SOC 350 may be programmable to implement such one or more storage controllers.

Each of the subsampling logic 255a-x may operate the network interface 390 to receive the captured images transmitted to the decoding device 300 via the network 999 by corresponding ones of the cameras 100a-x, and each of the subsampling logic 255a-x may store the received captured images within the image storage 260 as a corresponding one of the image data 130a-x. Each of the subsampling logic 255a-x may divide each of the images captured by the image sensor 110 of its corresponding one of the cameras 100a-x into tiles and then perform a transform, per tile, to generate one or more metadata values that each of the sampling logic 255a-x may store within the image storage 260 as a corresponding one of the metadata 230a-x. Each of the subsampling logic 255a-x may then provide its corresponding one of the metadata 230a-x to the processor 355.

The processor 355 may be caused by execution of the instructions of the control routine 345 to operate the decoding storage 360 to store the received one or more of the metadata 230a-x therein. Again, the processor 355 may also be caused to analyze at least one metadata value for each tile within each of the received and stored metadata 230a-x, based on one or more parameters retrieved from the parameter data 335, to identify a cluster of adjacent tiles of sufficient quantity within at least one of the images captured by the image sensor 110 of at least one of the cameras 100a-x that may include an indicia. In response to identifying such a cluster, the processor 355 may be caused to transmit, to the one of the subsampling logic 255a-x associated with the one of the cameras 100a-x that captured the image that includes the cluster of tiles, a request for a ROI within that image that includes the cluster.

That one of the subsampling logic 255a-x may respond to the receipt of the request by retrieving a portion of the corresponding one of the image data 130a-x that includes the ROI from the image storage 260 and providing it to the processor 355. In embodiments in which each of the subsampling logic 255a-x maintains no more than a predetermined quantity of most recently captured images within the corresponding one of the image data 130a-x, the predetermined quantity may be selected to be large enough to ensure that any image associated with such a request for a ROI is caused to remain available long enough to so provide the requested ROI in response.

In response to receiving the ROI from the one of the subsampling logic 255a-x to which the processor 355 transmitted the request, the processor 355 may store the received ROI as a corresponding one of the image data portions 133a-x within the decoding storage 360. Again, the processor 355 may then be caused by further execution of the instructions of the control routine 345 to analyze the received ROI, based on one or more parameters retrieved from the parameter data 335, to determine whether an indicia is present within the ROI. Again, if the processor 355 determines that there is an indicia within the received ROI, then the processor 355 may interpret the indicia to decode the data encoded therein, which the processor 355 may store within the decoding storage 360 as the decoded data 330. The processor 355 may then operate the network interface 390 to transmit the decoded data 330 to another device (e.g., the depicted server 900) via the network 999.

Referring to both FIGS. 1A and 1B, the image sensor 110 may be based on any of a variety of technologies and may employ any of a variety of optical scanning and/or other image capturing techniques to capture an image of an indicia carried by a portion of an object. More specifically, the image sensor 110 may include any of a variety of light sensing components to effect the capture of an image of an indicia, including and not limited to, a charge-coupled device (CCD) providing a single row of individual light sensors operated in a manner that sweeps over an indicia to scan it, or a CCD providing a two-dimensional (2D) array of individual light sensors to capture a 2D image of an indicia. In some embodiments, the image sensor 110 may emit various forms of collimated and/or monochromatic light, including light that projects any of a variety of patterns onto a surface of an object that carries an indicia. As those skilled in the art will readily recognize, such an emission of light may be to provide sufficient illumination to ensure that an indicia is sufficiently visible to be captured, and/or may be to provide a visible pattern of markers on a surface of an object and/or an indicia as a guide to determining the orientation of the indicia relative to the image sensor 110 to improve the accuracy with which the data encoded within the indicia may be decoded.

The object onto which an indicia may be applied may be any of a variety of objects, including and not limited to, a package carrying a shipping label that includes an indicia, or a product for sale within retail packaging on which an indicia is printed as part of the graphical artwork thereof. The data encoded within such an indicia may include, and not be limited to, data indicating the addresses of a sender and/or intended recipient of a package, or data providing a universal product code (UPC) that uniquely identifies a product for sale.

Thus, such an indicia may be any of a variety of forms of one-dimensional (1D) optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

Each of the subsampling logic 255 or 255a-z may be implemented using any of a variety of digital logic technologies and/or components, including and not limited to, discrete transistor components, transistor arrays, discrete gate logic components, programmable logic arrays (PLAs), programmable logic devices (PLDs), field-programmable gate arrays (FPGAs), etc. Where programmable logic is used, such logic may be programmed through the burning of fuses. Alternatively, where programmable logic is used, such logic may be programmed through the storage of a logic configuration within one or more storage devices from which data for the logic configuration is retrieved (e.g., a FPGA), and which may be based on any of a variety of non-volatile storage technologies, including and not limited to, read-only memory (ROM), programmable read-only memory (PROM), erasable PROM (EPROM), electrically erasable PROM (EEPROM), NAND FLASH or other form of FLASH memory, magnetic or optical cards, one or more individual ferromagnetic disk drives, and/or a plurality of storage devices organized into one or more arrays (e.g., multiple ferromagnetic disk drives organized into a Redundant Array of Independent Disks array, or RAID array).

Each of the image storages 260 and/or the decoding storage 360 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, each of the image storages 260 and/or the decoding storage 360 may be based on any of a variety of non-volatile storage technologies.

The processor 355 may include any of a wide variety of processors, microcontrollers, gate-array logic devices, etc. that may be incorporate any of a variety of features to enhance speed and/or efficiency of processing operations. Such features may include and are not limited to, multi-threading support, multiple processing cores, single-instruction multiple-data (SIMD) support, directly integrated memory control functionality, and/or various modes of operation by which speed of throughput and/or level of power consumption may be dynamically altered.

Each of the network interfaces 190 and 390 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the network interfaces 190 and 390 may each be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2B:
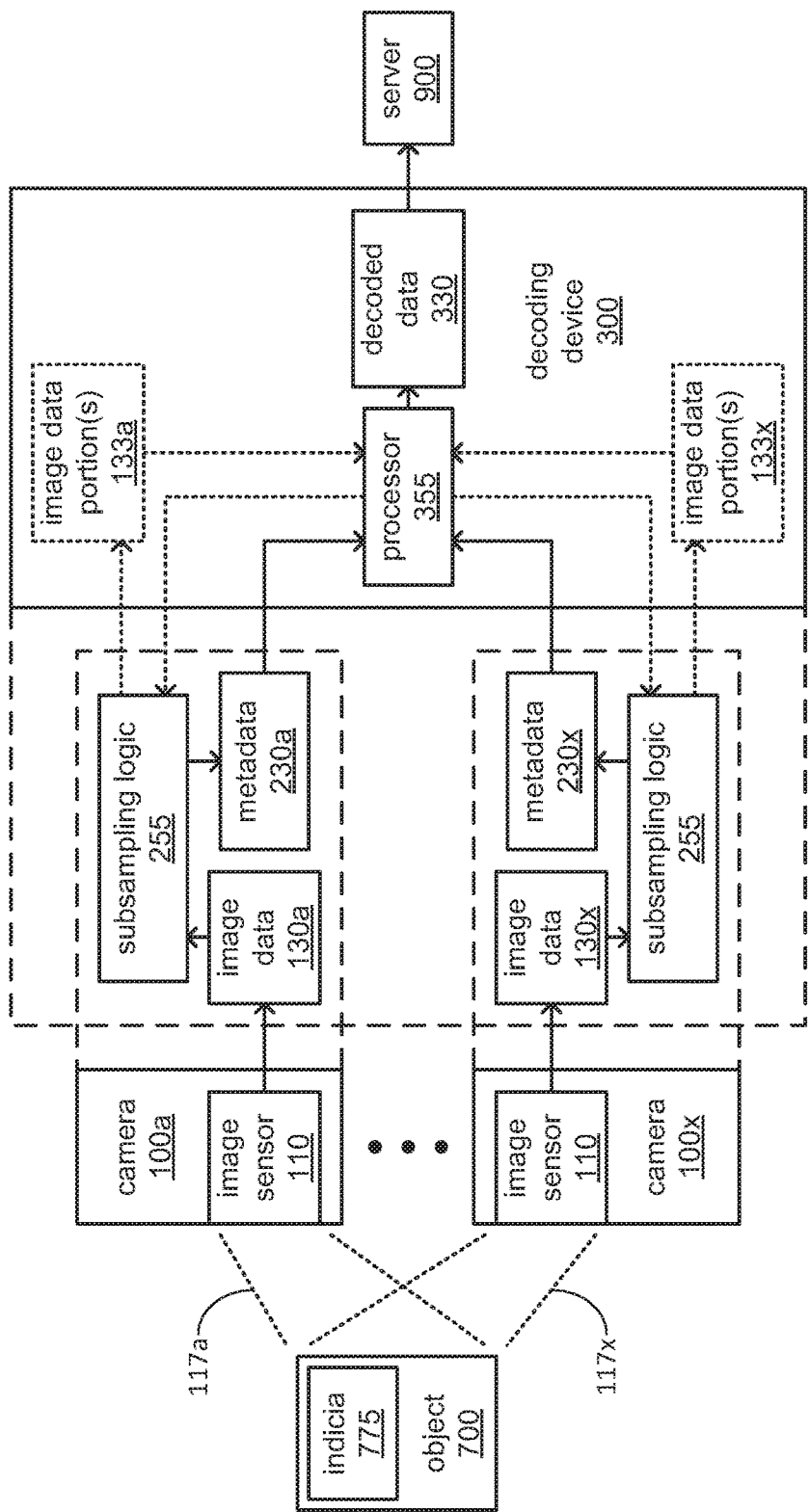

FIGS. 2A and 2B, together, depict aspects of an example of use of an example implementation of the decoding system 1000 of either of FIG. 1A or 1B in capturing, identifying and decoding an indicia 775 printed on a label 770 applied to a surface of an object 700 in the form of a package is moved along a conveyor 800. More specifically, FIG. 2A provides a combination of perspective view and block diagram of an example implementation of the decoding system 1000 that includes at least four cameras 100a, 100b, 100c and 100x positioned in a manner that surrounds a location along the length of the conveyor belt 800 through which the object 700 is moved. FIG. 2B provides a block diagram depicting aspects of the at least partially parallel performance of transforms as part of identifying the indicia 775 within an image captured by at least one of the cameras 100a-x. While this example is introduced with FIGS. 2A and 2B, aspects of the identification and decoding of the indicia 775 are depicted in, and will be further discussed in reference to, other figures herein.

However, it should be noted that this depiction of this example use of this example implementation of the decoding system 1000 is but one possible example provided herein for purposes of illustration, and should not be taken as limiting. Stated differently, other uses of other implementations of the decoding system 1000 are possible in which the object 700 may be any of a variety of objects other than a package moved along a conveyor, in which a different quantity of the cameras 100a-x are used, and/or in which the cameras may be mounted as a set to a vehicle such that it is the cameras 100a-x of the decoding system 1000 that is moved relative to the object 700, instead of the object 700 being moved relative to the cameras 100a-x.

Turning more specifically to FIG. 2A, the at least four cameras 100a-x are positioned to cause at least a portion of a location along the conveyor 800 to be placed within each of the FOVs 117a-x of the image sensor 110 within each of the cameras 100a-x, respectively. As depicted, two or more of the FOVs 117a-x may overlap. However, it should be noted that embodiments are possible in which none of the FOVs 117a-x overlap. Indeed, other embodiments are possible in which two or more of the cameras 100a-x may be positioned to place entirely different locations of the conveyor 800 within their respective ones of the FOVs 117a-x. Stated differently, the at least four cameras 100a-x may be positioned to cover a single location along the conveyor 800 such that each is able to capture an image of a different portion of the object 700 simultaneously as the object 700 moves along the conveyor 800, or the at least four cameras 100a-x may be positioned to cover different locations along the conveyor 800 such that each is able to capture an image of a different portion of the object 700 as the object 700 moves through their separate ones of the FOVs 117a-x at different times.

Regardless of the manner in which the cameras 100a-x are positioned relative to one or more locations along the conveyor 800, and as has been discussed in reference to FIG. 1, the cameras 100a-x may be communicatively coupled to the decoding device 300 through the network 999, and may cooperate with the decoding device 300 through the network 999 to identify and decode the indicia 775 captured in at least one image by at least one of the cameras 100a-x. Also as discussed in reference to FIG. 1, following such decoding, the decoded data 330 may be transmitted by the decoding device 300 to another device via the network 999, such as the depicted server 900.

Turning more specifically to FIG. 2B, aspects of the internal architecture of the decoding system 1000 are depicted along with aspects of the at least partially parallel analysis of multiple captured images to identify the indicia 775 within at least one of the multiple captured images. More specifically, regardless of whether each one of the cameras 100a-x incorporates a subsampling logic 250 or the decoding device 300 incorporates a separate corresponding subsampling logic 250a-x for each camera 100a-x, the dedication of such separate subsampling logic to each of the cameras 100a-x enables the at least part of the processing to determine whether the indicia 775 is included within each of the images captured by the image sensor 110 of each of the cameras 100a-x to be performed at least partially in parallel. More specifically, the tiling of images captured by the image sensor 110 within each of the cameras 100a-x is able to be performed in parallel by such separate subsampling logic, as is the performance of transforms with the tiles of each of the captured images to generate corresponding ones of the metadata 230a-x.

Further, in embodiments in which the processor 355 incorporates multiple independently operable processing cores such that a separate one of the processing cores may be associated with each of the cameras 100a-x, the analysis of each of the metadata 230a-x to determine whether the indicia 775 is present in any of the captured images may also be performed in parallel. Each such processing core of the processor 355 may also independently transmit a request for a ROI, and may independently analyze its corresponding one of the image data portions 133a-x that are provided to the processor 355 in response.

However, and as will be explained in greater detail, some degree of serialization may be imposed where the processor 355 may delay the transmission of data decoded from the indicia 775 to the server 900 to await a determination of whether or not all of the indicia identified in each of the images captured by the image sensors 110 of each of the cameras 100a-x are all of the same indicia 775. Stated differently, it may be deemed desirable to avoid transmitting multiple copies of the decoded data 330 decoded from multiple captured images that include the same indicia 775 to the server 900.

FIGS. 3A, 3B, 3C and 3D, together, depict aspects of the internal architecture of the decoding system 1000 in greater detail in relation to the identification and decoding of the indicia 775 of the example of FIGS. 2A and 2B in one or more images captured by a single one of the cameras 100a-x, specifically camera 100a. It should be noted that the depicted subsampling logic 255 may be either the subsampling logic 255 incorporated into the camera 100a, or a corresponding the corresponding subsampling logic 255a incorporated into the decoding device 300. It should also be noted that, despite the depiction of a barcode as the example indicia 775, other embodiments are possible in which the indicia may of an entirely different type (e.g., a 2D form of visual encoding, such as a QR code).

Figure 3A:
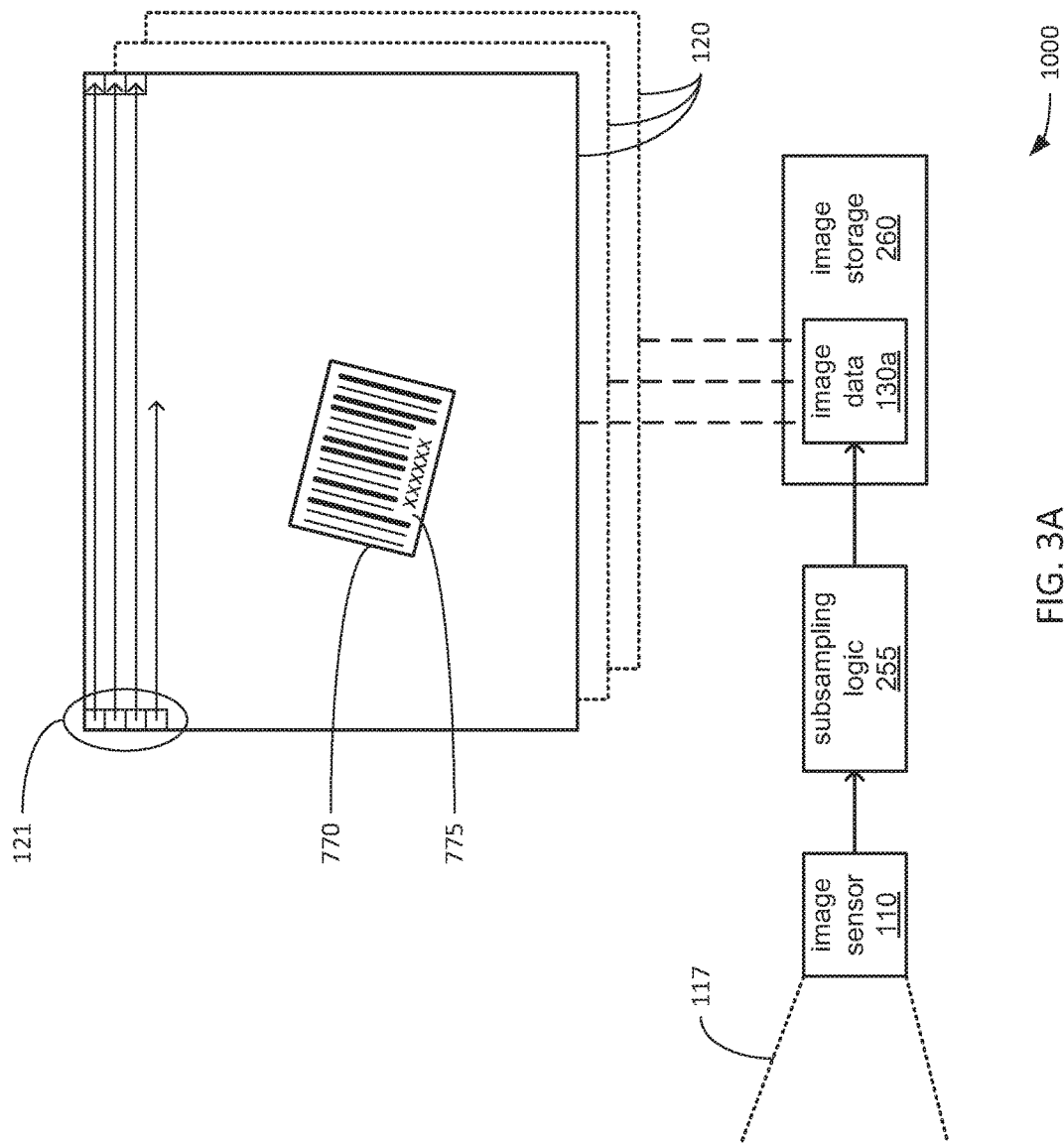

Turning to FIG. 3A, the image sensor 110 of the camera 100a of the decoding system 1000 may capture at least one image 120 in its FOV 117a of a portion of the object 700 to which the label 770 (see FIG. 2A) that includes the indicia 775 has been applied such that the indicia 775 may be included in the captured image. As will be familiar to those skilled in the art, at least in embodiments in which the image sensor 110 is implemented as a CCD or other type of light sensing device incorporating a 2D array of light sensing elements, the image sensor 110 may output, to the subsampling logic 255, a serial bitstream of values indicating the grayscale levels detected by separate ones of the light sensing elements of the pixels 121 of each captured image 120. As depicted, the order in which those grayscale values in the serial bitstream are output by the image sensor 110 may follow a left-to-right raster scan order within each horizontal row of pixels 121 of each image 120, starting with the top row of image and progressing row-by-row from top-to-bottom in each image 120.

In some embodiments, the decoding system 1000 may be configured to cause each of the cameras 100a-z to take capture a single image of the object 700 within its corresponding FOV 117a-z. Thus, there would be only one image 120 captured by the image sensor 110 of the camera 100a of the object 700 to be processed. Such triggering may be based on the output of a sensor (not shown) that detects the proximity of the object 700, and that is monitored by the decoding device 300, which may transmit a command to the cameras 100a-z via the network 999 to trigger a single image capture by each. Alternatively, in other embodiments, the decoding system 100 may be configured to cause each of the cameras 100a-z to recurringly capture images 120 on timed basis, such as at selected frame rate. Thus, at a recurring interval of time, the image sensor 110 of the camera 100a would capture a new image 120 to be processed, where each such image 120 may or may not include an image of the object 700 and/or an image of another object that may or may not carry any indicia, whatsoever.

Regardless of whether the image sensor 110 captures only a single image 120 of the object 700, or multiple images 120 in a succession in which only a subset may include an image of the object 700, the subsampling logic 255 may store each bitstream received from the sensor 110 of each captured image 120 as part of the image data 130a within the image storage 260. More precisely, the grayscale values of the pixels 121 of each captured image 120 may be stored by the subsampling logic 255 as the image data 130a.

In some embodiments, the image sensor 110 of each of the cameras 100a-z may be a monochrome image sensor capable of capturing monochromatic images such that there is only a single grayscale value for each pixel 121. In such embodiments, each of the grayscale values may be a byte-wide (i.e., 8-bit) value that specifies an intensity level of a separate one of the pixels 121 (although grayscale values of greater or lesser bit width may also be used). However, in other embodiments, the image sensor 110 of at least one of the cameras 100a-z may be a color image sensor capable of capturing color images such that there may be multiple values for each pixel 121, including one or more grayscale values for each pixel. More precisely, in such other embodiments, a color space encoding scheme may be used in which the color of each pixel 121 is specified with multiple grayscale values that each specify a relative level of intensity of a different color component of the color, such as and not limited to, red-green-blue (RGB) or cyan-magenta-yellow-black (CMYK). RGB color space encoding often entails the allocation of 8, 12, 16, 24 or 32 bits per pixel to store the three grayscale values for the red, green and blue intensities. Alternatively, a color space encoding scheme may be used in which the color of each pixel 121 is specified with a single grayscale value that specifies an intensity level accompanied by one or more chrominance values that specify a color mapped to the one or more chrominance values, such as and not limited to, luminance-chrominance (YUV). Therefore, as used herein, the term "grayscale value" is intended to denote the single value specifying the level of intensity of either a single monochromatic pixel 121 or a single color pixel 121, or is intended to denote one of the multiple grayscale values specifying the level of intensity of a color component of one of the color components that specify the color of a single pixel 121.

Figure 3B:
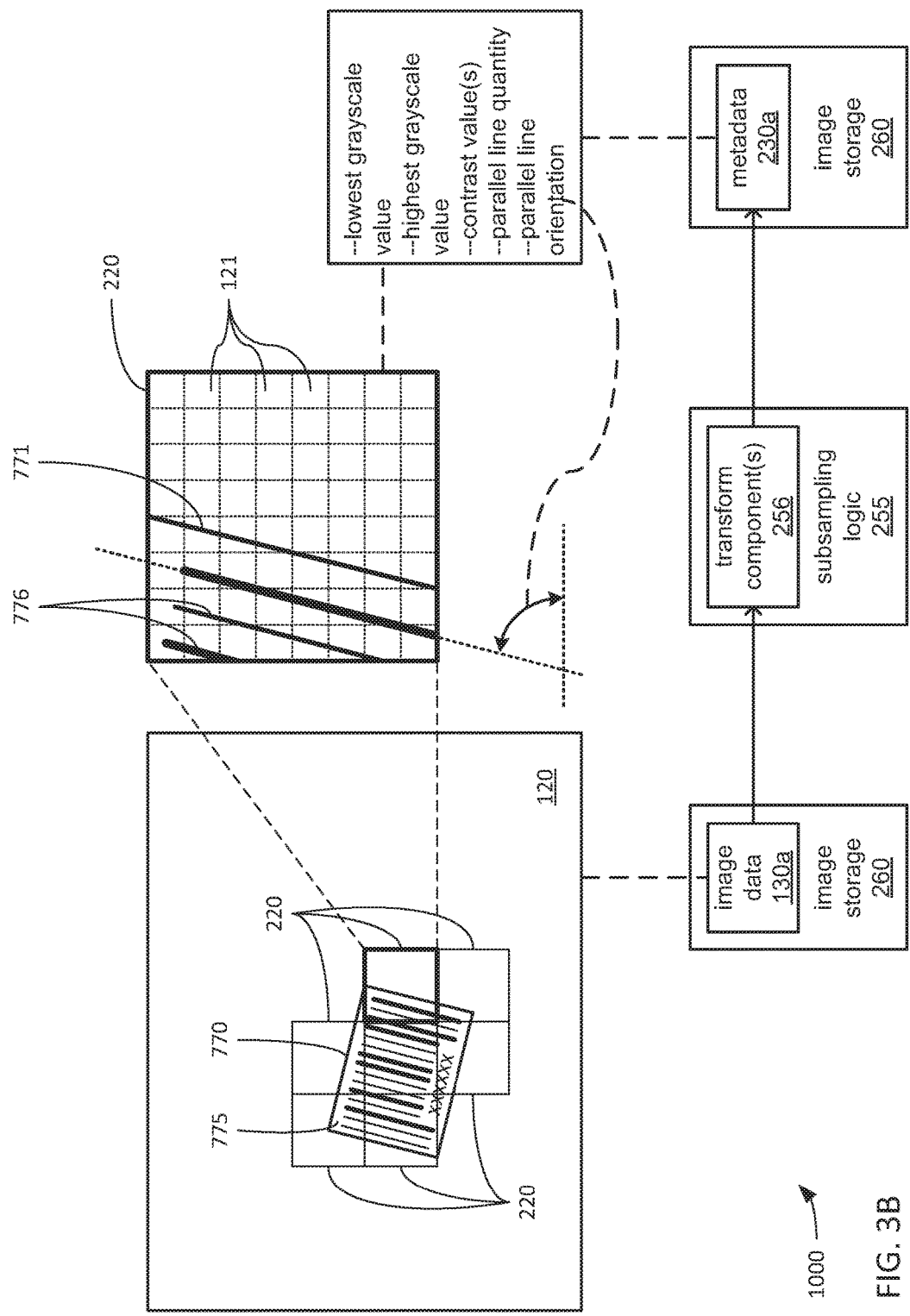

Turning to FIG. 3B, the subsampling logic 255 may divide the image 120 into multiple tiles 220 (of which only a few are shown for sake of clarity). Each tile 220 may be defined by a 2D array of the pixels 121 of the image 120 (e.g., an 8×8 array, a 16×16 array, etc.). At least one transform component 256 may be implemented within the subsampling logic 255. For each one of the tiles 220, the at least one transform component 256 may perform a transform with the grayscale values retrieved from the image data 130a for each of the pixels 121 within each tile 220 to derive corresponding metadata data values for each tile 220 that may be stored by the subsampling logic 255 as the metadata 230a.

In some embodiments, the transform that is performed may be the Saporetti transform (S-transform) described in U.S. Pat. No. 6,047,893 issued Apr. 11, 2000, to Claudio Saporetti, the disclosure of which is incorporated herein by reference. Among the metadata values that may be generated for a tile 220 from a performance of the S-transform therewith may be metadata values indicating the highest and lowest grayscale values found among the pixels 121 within the tile 220, the greatest contrast in grayscale values found within the tile 220, a quantity of parallel lines found within the tile 220 (if any), and/or an orientation angle of the parallel lines (if any are found). The S-transform may be implemented in any of a variety of ways providing a greater or lesser degree of accuracy, and may be implemented in any of a variety of ways selected to ease implementation of each of the one or more transform components 256 to perform the S-transform.

However, it should be noted that other embodiments are possible in which one or more other transforms and/or other types of analyses may be performed with the grayscale values of the pixels 121 within each tile 220 to generate metadata values for each tile 220. Such other transforms and/or analyses may be performed either in lieu of or in addition to the S-transform. By way of example, in some embodiments, one or more filters and/or spatial transforms may be utilized to condition the grayscale values of the pixels 121 prior to the performance of the S-transform.

Figure 4A:
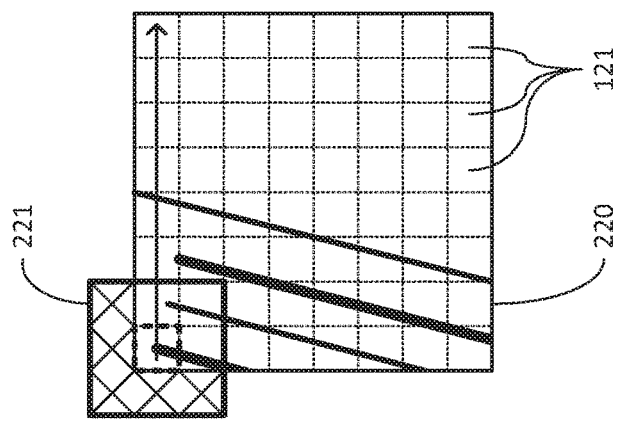
FIGS. 4A, 4B and 4C, together, show aspects of convolving a stencil to perform a transform.
Figure 4B:
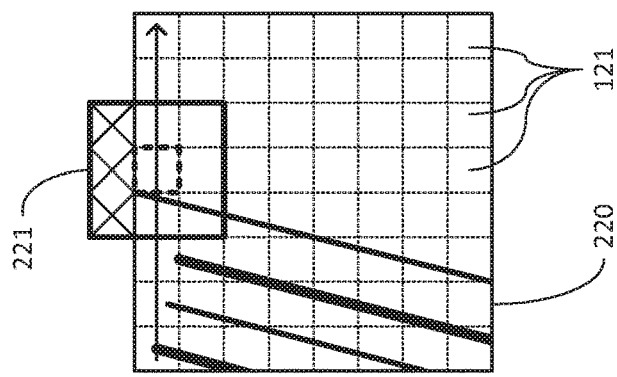
Figure 4C:
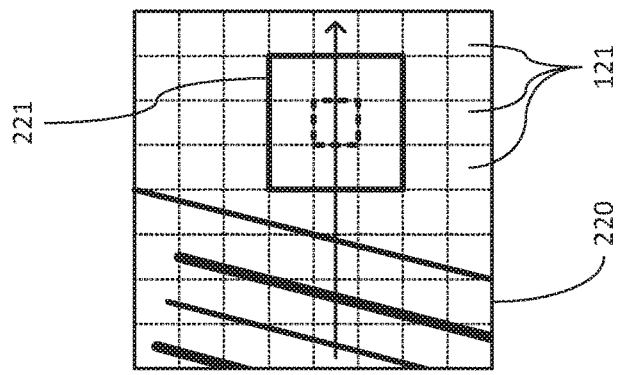
Figure 5C:
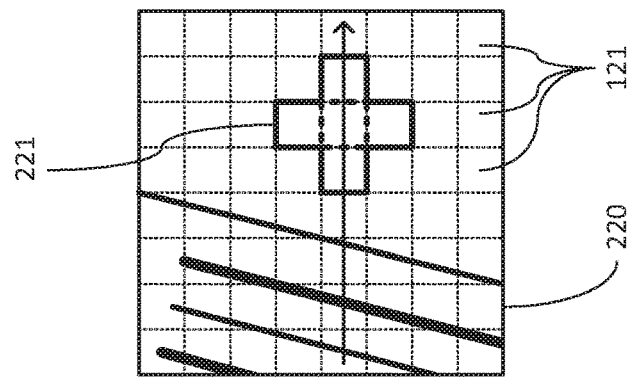
FIGS. 5A, 5B and 5C, together, show aspects of convolving an alternate stencil to perform a transform.
Figure 5B:
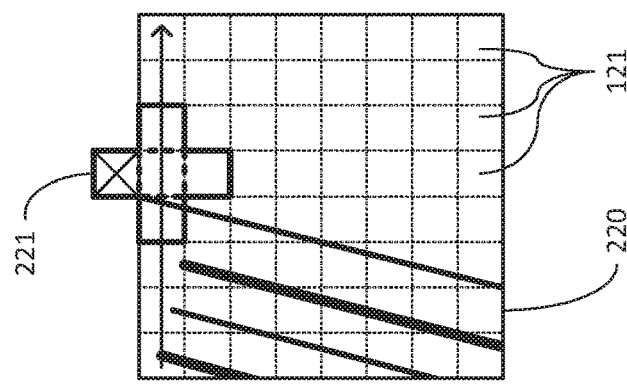
Figure 5A:
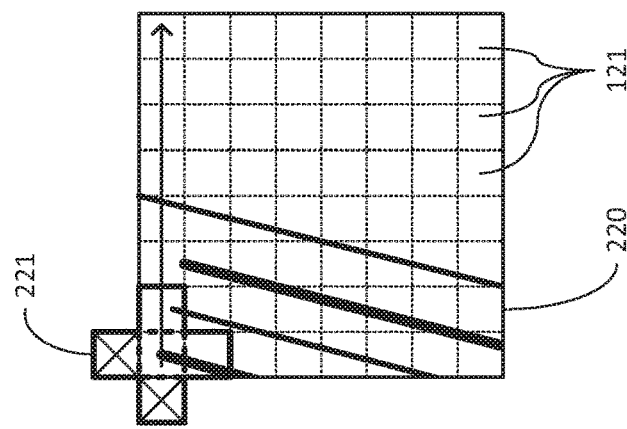

In performing at least the S-transform, a stencil may be convolved about the 2D array of pixels 121 within each of the tiles 220. FIG. 4 depicts an example of convolving a square stencil 221 made up of a 3×3 array of pixels 121. FIG. 5 depicts an example of convolving a cross-shaped stencil made up of less than all of a 3×3 array of pixels 121. As will be familiar to those skilled in the art, any of a variety of techniques may be employed to address the occurrences of part of the stencil 221 extending beyond the boundaries of the tile 220 about which it is convolved such that pixels 121 of one or more neighboring tiles 220 may be covered by the stencil and/or occurrences of part of the stencil 221 extending beyond the boundaries of the captured 120 such that part of the stencil extends to where there are no pixels 121. As depicted, in such instances, no grayscale values that may be present within the part of the stencil 221 that extends beyond the boundaries of the tile 220 and/or beyond the boundaries of the captured image 120 are not included in the S-transform calculations associated with the stencil 221.

Returning to FIG. 3B, in some embodiments, the subsampling logic 255 may implement multiple transform components 256 that may be operated in parallel to perform the S-transforms with the grayscale values of the pixels 121 of multiple ones of the tiles 220 in parallel. As previously discussed, the image sensor 110 may output a serial bitstream of grayscale values organized in horizontal raster scan order starting with the topmost horizontal row and proceeding downward to the bottommost horizontal row. In such embodiments, advantage may be taken of this ordering of grayscale values to perform the S-transform on whole horizontal rows of the tiles 220 at a time, as the image sensor 110 provides grayscale values for a sufficient number of horizontal rows to enable at least the commencement of performance of the S-transform with each successive horizontal row of tiles 220. An example of such a parallel performance of the S-transform is depicted in FIG. 6.

Returning to FIG. 3B, as depicted within one of the tiles 220 for which an enlarged view is provided, the performance of the S-transform with the grayscale values of the pixels 121 thereof may beget an metadata value indicating either three or four parallel lines depending on whether the depicted border 771 of the label 770 on which the lines 776 of the depicted barcode example of the indicia 775 are printed.

Turning more specifically to FIG. 3C, as the metadata 230a associated with one or more tiles 220 of the image 120 captured via camera 100a is provided to the processor 355, such metadata 230a may be stored by the processor 355 within the decoding storage 360. In executing a ROI identification component 346 of the control routine 345, the processor 355 may be caused to analyze one or more metadata values within the metadata 230a for each tile 220 to identify a cluster of adjacent tiles 220 within the image 120 that may include an image of an indicia, such as the indicia 775.

In some embodiments, such an analysis may entail a comparison of metadata values, such as highest and lowest grayscale values, highest contrast value, quantity of parallel lines and/or angle of orientation of those parallel lines to corresponding ones of various threshold values included within the parameter data 335. Such threshold values may include minimum and/or maximum grayscale thresholds, a minimum contrast threshold and/or a minimum quantity of parallel lines. Thus, in performing such an analysis, per tile 220, the processor 355 may be caused to compare the indications in the metadata 230a for the lowest and highest grayscale values, the highest contrast value and/or the quantity of lines associated with each of the tiles 220 to such thresholds to determine whether such characteristics of the tile are consistent with the tile including a portion of the indicia 775.

Upon identifying ones of the tiles 220 having characteristics consistent with including a portion of the indicia 775, the processor 355 may then be caused to identify one or more clusters of adjacent ones of such tiles where the quantity of such adjacent tiles meets a minimum adjacent tile quantity threshold specified in the parameter data 335. Additionally, the processor 355 may be caused to compare the metadata values indicating an angle of orientation of the parallel lines found within each of the tiles 220 of each such cluster to determine whether their angles of orientation match. By way of example, for a barcode such as the example barcode indicia 775, the lines 776 of the indicia 775 are parallel to each other, and therefore, should have the same angle of orientation across the all of the tiles 220 into which they extend. If the indicated angle of orientation differs between two adjacent tiles 220, then the angles of orientation may be presumed to belong to unrelated sets of parallel lines such that the lines 776 that may be present within one of the two tiles 220 may be presumed to not extend into the other of the two tiles 220.

In various embodiments, the thresholds specified in the parameter data 335 may be based on experimentation with examples of indicia having the characteristics expected to be encountered in the indicia that are meant to be identified and decoded by the decoding system 1000. As will be familiar to those skilled in the art, different types of indicia may have differing densities of lines, blocks and/or other graphical elements. Also, the expected size of such indicia and the distance that each of the cameras 100a-x are expected to be from such indicia must be taken into account. As a result, the parameter data 335 may include a set of initial values for such thresholds to be used as a starting point in the performance of various tests of the decoding system 1000 under the conditions in which it is to be used to adjust the threshold values. Such testing may also be required to adjust an initial value that may be included within the parameter data 335 for a minimum quantity of adjacent tiles for a cluster. As with one or more of the other threshold values, the expected size of the indicia 775 and the expected distance of each of the cameras 100a-x from the indicia 775 may affect the minimum quantity of adjacent tiles for a cluster.

Upon identifying a cluster of adjacent tiles 220 that is of sufficient quantity among the tiles of the image 120, the processor 355 may be caused by its execution of the ROI identification component 346 to transmit a request to the subsampling logic 255 to provide a ROI 320 that includes the cluster of tiles 220. In some embodiments, the processor 355 may be caused to specify the ROI 320 as a rectangular array of the tiles 220 that includes at least the tiles 220 of the identified cluster, and may include additional adjacent ones of the tiles 220 to create a complete the rectangular array.

Further, in some embodiments, the processor 355 may be caused to increase the size of the ROI 320 beyond the leftmost, rightmost, topmost and bottommost boundaries of the identified cluster of tiles 220 to ensure that all of the indicia 775 is included within the requested ROI 320. Such increasing of the size of the ROI 320 may be deemed desirable to counteract situations in which a small enough portion of the indicia 775 is included within a tile 220 that one or more of the metadata values generated by the performance of the transform for that tile 220 do not meet one or more of the thresholds. By way of example, if too small a quantity of the lines 776 of the indicia 775 fall within one of the tiles 220, then the resulting metadata value specifying the quantity of parallel lines within that tile 220 may be too low.

Turning to FIG. 3D, in response to receiving the request for the ROI 320, a ROI component 257 of the subsampling logic 255 may retrieve the grayscale values within the image data 130 for the pixels 121 of the image 120 that are included within the requested ROI 320, and may transmit those grayscale values to the processor 355. The processor 355 may be caused by its execution of an indicia decoding component 347 of the control routine 345 to store those grayscale values of the pixels 121 within the ROI 320 within the decoding storage 360 as the image data portion 133a. The processor 355 may analyze the received grayscale values of the ROI 320 to determine whether there is an indicia (e.g., the indicia 775) within the ROI 320. Upon determining that there is an indicia within the ROI 320, the processor 355 may then be caused by further execution of the indicia decoding component 347 to interpret the indicia 775 to decode the data that is encoded therein, and may store that data within the decoding storage 360 as the decoded data 330.

In determining whether there is an indicia within the ROI 320 and/or in interpreting any indicia that may be determined to be present within the ROI 320, the processor 355 may employ various decoding parameters that may also be stored as part of the parameter data 335. Such decoding parameters may include one or more sets of rules by which the presence of an indicia may be confirmed and/or one or more sets of rules by which an indicia that adheres to one or more standards for indicia may be interpreted.

Following the interpretation of the indicia 775 determined to be present within the ROI 320, and the storage of the decoded data therefrom, the processor 355 may be caused to delay transmission of the decoded data 330 to the server 900 (or other device) via the network 999 until all images 120 captured of the object 700 by each of the cameras 100a-x have been processed. This may be deemed desirable to enable all indicia that may be applied to all of the surfaces of the object 700 that enter into the FOVs 117a-x of the cameras 100a-x, respectively, have been captured and interpreted so that no encoded data is missed. Alternatively or additionally, this may also be deemed desirable to ensure that all duplicative data decoded from all of the different images 120 that may be captured of the indicia 775 and/or of any other indicia carried by the object 700 has been decoded so that the duplicative data can be identified and eliminated. In this way, a single transmission of the decoded data 330 that contains all data decoded from all indicia associated with the object 700 is transmitted one time to the server 900.

FIG. 7 is a flowchart 1100 depicting aspects of operation of the decoding system 1000. More specifically, FIG. 7 depicts aspects of operations performed by the processor 355 of the decoding device 300 under the control of instructions of the control routine 345, and operations performed by either the subsampling logic 255 incorporated into one of the cameras 100a-z or one of the subsampling logic 255a-x incorporated into the decoding device 300.

At 1110, an image sensor of a camera of a decoding system (e.g., the image sensor 110 of one of the cameras 100a-x of the decoding system 1000) captures an image of an object within its FOV (e.g., an image 120 of the object 700 within a corresponding one of the FOVs 117a-x). As has been discussed, the camera of the decoding system may be one of multiple cameras of the decoding system (e.g., one of the multiple cameras 100a-x).

At 1120, a subsampling logic incorporated into either the camera or a decoding device of the decoding system (e.g., either the subsampling logic 255 incorporated into one of the cameras 100a-x, or one of the subsampling logic 255a-x incorporated into the decoding device 300) may store the captured image as image data within an image storage that is accessible to the subsampling logic (e.g., as one of the image data 130a-x within the image storage 260 incorporated into either one of the cameras 100a-x or into the decoding device 300). As has been discussed, the subsampling logic 255 or one of the subsampling logic 255a-x may receive a captured image 120 from the image sensor 110 of a corresponding one of the cameras 100a-x as a serial bitstream of grayscale values of the pixels 121 of the captured image 120 in raster scan order.

At 1122, the subsampling logic may divide the captured image into tiles (e.g., divide a captured image 120 into tiles 220). At 1124, the subsampling logic may then convolve a stencil (e.g., one of the possible shapes of the stencil 221) about the pixels of each of tiles as part of performing a transform with the grayscale values of the pixels of each of the tiles to derive separate metadata values for each of the tiles. As has been discussed, in at least some embodiments, the transform may be a Saporetti transform (S-transform), and may be performed in parallel with the grayscale values of the pixels of multiple tiles of the captured image using multiple transform components 256 incorporated into the subsampling logic 255 or 255a-x associated with one of the cameras 100a-x, respectively. As has also been discussed, the metadata values generated through the performance of the transform for each of the tiles may be stored as one of the metadata 230a-x.

At 1126, the subsampling logic may transmit the metadata values so derived for each of the tiles to the decoding device as metadata (e.g., one of the metadata 230a-x). As has been discussed, the subsampling logic 255 incorporated into one of the cameras 100a-x may operate the network interface 190 of the camera to transmit the corresponding one of the metadata 230a-x to the decoding device 300 to provide it to the processor 355, while one of the subsampling logic 255a-x incorporated into the decoding device 300 may more directly provide the corresponding one of the metadata 230a-x to the processor 355 via a bus or other interconnect therebetween within the decoding device 300.

At 1130, the processor may be caused by its execution of instructions of a control routine (e.g., the control routine 345) to analyze at least one metadata value of the metadata of each of the tiles of the image to identify clusters of adjacent tiles of the image that may include an indicia encoding data. At 1132, the processor may be further caused to compare one or more metadata values of each of the tiles within each cluster that are indicative of an angle of orientation of parallel lines found within each of those tiles to further refine the identification of clusters of adjacent tiles that may include an indicia encoding data. As has been discussed, many forms of such indicia include parallel lines (e.g., the parallel lines 776) that should extend across all of the tiles 220 that include a portion of the indicia such that the corresponding metadata values indicating angle of orientation of parallel lines within each (presuming there is a sufficient quantity thereof) should match.

At 1134, for each identified cluster of tiles in which an indicia may be present, the processor may transmit a request to the corresponding subsampling logic to provide a ROI (e.g., the ROI 320) defined as a rectangular portion of an image that includes the cluster. As has been discussed, the boundaries of each such ROI 320 may be selected to extend both horizontally and vertically outward to a greater degree than the topmost, bottommost, leftmost and rightmost boundaries of the corresponding cluster. Again, this may be deemed desirable to ensure that the entirety of the indicia is included within the ROI.

At 1140, the subsampling logic may respond to the request for the ROI by transmitting the grayscale values of the pixels within the ROI to the processor. As has been discussed, the processor 355 may store the received grayscale values of an ROI within the decoding storage 360 as a corresponding one of the image data portions 133a-x.

At 1150, the processor may analyze the grayscale values of the pixels of the ROI to determine whether or not an indicia is present within the ROI. At 1152, presuming that an indicia is determined by the processor to be present within the ROI, the processor may interpret the indicia to decode the data that is encoded therein. At 1154, the processor may transmit the decoded data (e.g., the decoded data 330) to another device, such as a server (e.g., the server 900). As has been discussed, the processor 355 may delay the transmission of the decoded data 330 until all images that may be taken by all of the cameras 100*a-x* of an object have been processed to identify and then decode any indicia included within any of those images. Again, this may be deemed desirable to enable all pieces of encoded data to be found in all indicia that may be present on one or more surfaces of the object, and to enable the processor 355 to identify and eliminate and duplicative decoded data.

There is thus disclosed a reader to capture encoded data. A decoding device may include a decoding storage configured to store metadata of each tile of an image of a portion of an object captured by an image sensor of a camera, wherein: the image is divided by a subsampling circuit associated with the camera into multiple tiles, each tile comprises a two-dimensional (2D) array of pixels of a portion of the image, the metadata of each tile is derived by the subsampling circuit from a performance of a transform with grayscale values of the 2D array of pixels, and the metadata is descriptive of at least one characteristic of at least a portion of the 2D array of pixels. The decoding device may also include a processor coupled to the decoding storage, the processor configured to, for each tile of the image, compare a metadata value of the corresponding metadata to a first threshold to identify at least one tile of the image that comprises a portion of an indicia that encodes data. The processor may also be configured to, in response to an identification of a cluster of adjacent tiles of the image in which the metadata value of each tile of the cluster meets the first threshold, and in which the cluster comprises a quantity of tiles that meets a second threshold: transmit a request to the subsampling circuit to provide a region of interest (ROI) of the image that comprises the cluster; analyze the ROI to determine whether the ROI contains the indicia; and in response to a determination that the ROI contains the indicia, interpret the indicia to decode the encoded data and transmit the decoded data to a server via a network.

The metadata value of the metadata of a tile of the image may be selected from the set consisting of: a lowest grayscale value among the 2D array of pixels, a highest grayscale value among the 2D array of pixels, a value indicative of a contrast between grayscale values of adjacent pixels within the 2D array of pixels, and a quantity of parallel lines within the 2D array of pixels. The first threshold may be selected from a set consisting of: a minimum difference between the lowest and highest grayscale values, a minimum value for the contrast, and a minimum quantity of parallel lines.

The identification of the cluster of adjacent tiles may further include an identification of a 2D array of tiles that meets a third threshold of a minimum quantity of rows of tiles and a fourth threshold of a minimum quantity of columns of tiles. The identification of the cluster of adjacent tiles may further include an identification of a plurality of tiles in which each tile includes at least one line that shares a single orientation.

The request to provide a ROI of the image may describe the ROI as a 2D array of tiles. The indicia may be selected from a group consisting of: a one-dimensional (1D) optically readable code and a 2D optically readable code.

The decoding device may further include the subsampling circuit, and an image storage accessible to the subsampling circuit, the image storage configured to store a plurality of images that includes the image and that are captured by the image sensor of the camera at a selected frame rate. The subsampling circuit may be configured to: recurringly refresh the plurality of images to include a predetermined quantity of most recently captured images of the plurality of images, divide each image of the plurality of images into multiple tiles, perform the transform with each tile to derive metadata from each tile, and provide the metadata derived from each tile to the processor. The processor may be configured to: compare the metadata value of the metadata of each tile of each image of the plurality of images to the first threshold to identify at least one of the cluster within at least one image of the plurality of images; for each identified cluster, transmit a request to the subsampling circuit to provide the corresponding ROI, analyze the ROI to determine whether the corresponding ROI contains the indicia, and in response to a determination that the corresponding ROI contains the indicia, interpret the indicia to decode the encoded data; and in response to a determination that at least one corresponding ROI contains the indicia, transmit the decoded data to the server via the network.

The decoding device may further include a plurality of subsampling circuits that includes the subsampling circuit, and at least one image storage accessible to the plurality of subsampling circuits, the at least one image storage configured to store a plurality of images that includes the image and that are captured by image sensors of a plurality of cameras that includes the camera. Each subsampling circuit of the plurality of subsampling circuits may be coupled to a corresponding image sensor of a corresponding camera of the plurality of cameras. Each subsampling circuit may be configured to: divide the corresponding image captured by the image sensor of the corresponding camera into multiple tiles, derive metadata from each tile, and provide the metadata derived from each tile to the processor. The processor may be configured to: for each image of the plurality of images, compare the metadata value of the metadata of each tile to the first threshold to identify at least one of the cluster within at least one image of the plurality of images; for each identified cluster, transmit a request to the corresponding subsampling circuit to provide the corresponding ROI, analyze the ROI to determine whether the corresponding ROI contains the indicia, and in response to a determination that the corresponding ROI contains the indicia, interpret the indicia to decode the encoded data; and in response to a determination that at least one corresponding ROI contains the indicia, transmit the decoded data to the server via the network.

The decoding device may further include a system-on-chip (SOC) integrated circuit, wherein the SOC comprises the processor and the plurality of subsampling circuits, and the decoding storage and the at least one image storage are coupled to the SOC. The decoding device may further include a network interface configured to couple the processor to the network, wherein each camera of the plurality of cameras is coupled to the network interface via the network.

Each camera of the plurality of cameras may include an image sensor configured to capture an image of the plurality of images within a field of view (FOV) of the camera, and the FOV of each camera of the plurality of cameras may at least partially overlap the FOV of at least one other camera of the plurality of cameras. The plurality of cameras may be positioned about a location through which the object moves to cause the location to fall within the FOV of each camera of the plurality of cameras, and the image sensor of each camera of the plurality of cameras may capture an image of the plurality of images of a portion of the object as the object is moved through the location.

A decoding system may include a camera that comprises an image sensor configured to capture an image of a portion of an object, and a subsampling circuit coupled to the image sensor. The subsampling circuit may be configured to: divide the image into multiple tiles, wherein each tile comprises a two-dimensional (2D) array of pixels of a portion of the image, and for each tile of the image, perform a transform with grayscale values of the 2D array of pixels to derive metadata descriptive of at least one characteristic of at least a portion of the 2D array of pixels. The decoding system may also include a processor coupled to the subsampling circuit, and the processor may be configured to, for each tile of the image, compare a metadata value of the corresponding metadata to a first threshold to identify at least one tile of the image that comprises a portion of an indicia that encodes data. The processor may also be configured to, in response to an identification of a cluster of adjacent tiles of the image in which the metadata value of each tile of the cluster meets the first threshold, and in which the cluster comprises a quantity of tiles that meets a second threshold: transmit a request to the subsampling circuit to provide a region of interest (ROI) of the image that comprises the cluster; analyze the ROI to determine whether the ROI contains the indicia; and in response to a determination that the ROI contains the indicia, interpret the indicia to decode the encoded data and transmit the decoded data to a server via a network.

The decoding system may further include a plurality of cameras that includes the camera, wherein each camera of the plurality of cameras may include an image sensor configured to capture an image of a plurality of images that includes the image and that is within a field of view (FOV) of the camera. The plurality of cameras may be incorporated into a camera array device. Each camera of the plurality of cameras may be positioned about a location through which the object moves to cause the location to fall within the FOV of each camera of the plurality of cameras, and the image sensor of each camera of the plurality of cameras may capture an image of the plurality of images of the object as the object is moved through the location.

The decoding system may further include a plurality of subsampling circuits that includes the subsampling circuit. Each subsampling circuit of the plurality of subsampling circuits may be coupled to the image sensor of a corresponding camera of the plurality of cameras. Each subsampling circuit may be configured to: divide the corresponding image captured by the corresponding camera into multiple tiles, perform the transform to with each tile to derive metadata from each tile, and provide the metadata derived from each tile to the processor. The processor may be configured to compare the metadata value of the metadata of each tile of each image of the plurality of images to the first threshold to identify at least one of the cluster within at least one image of the plurality of images; for each identified cluster, transmit a request to the corresponding subsampling circuit to provide the corresponding ROI, analyze the ROI to determine whether the corresponding ROI contains the indicia, and in response to a determination that the corresponding ROI contains the indicia, interpret the indicia to decode the encoded data; and in response to a determination that at least one corresponding ROI contains the indicia, transmit the decoded data to the server via the network.

The decoding system may further include a decoding device. The decoding device may include: the plurality of subsampling circuits; an image storage accessible to the plurality of subsampling circuits, the image storage configured to store the plurality of images that include the image and that are captured by the image sensors of the plurality of cameras; the processor; and a decoding storage accessible to the processor, the decoding storage configured to store the metadata of each tile of each image of the plurality of images. Each subsampling circuit may be coupled to the image sensor of a corresponding camera of the plurality of cameras through a corresponding coupling between the decoding device and each camera of the plurality of cameras.

The decoding system may further include a system-on-chip (SOC) integrated circuit, wherein the SOC may include the processor and the plurality of subsampling circuits and the decoding storage and the image storage are coupled to the SOC.

Each camera of the plurality of cameras may include: the corresponding subsampling circuit of the plurality of subsampling circuits that is coupled to the image sensor of the camera, and an image storage accessible to the corresponding subsampling circuit, the image storage configured to store the image of the plurality of images that is captured by the image sensor.

The decoding system may further include a decoding device. The decoding device may include the processor, and a decoding storage accessible to the processor, the decoding storage configured to store the metadata of each tile of each image of the plurality of images. The processor may be coupled to each subsampling circuit of the plurality of subsampling circuits through a corresponding coupling between the decoding device and each camera of the plurality of cameras. The decoding device may be coupled to the plurality of cameras via the network.

The metadata value of the metadata of a tile of the image may be selected from the set consisting of: a lowest grayscale value among the 2D array of pixels; a highest grayscale value among the 2D array of pixels; a value indicative of a contrast between grayscale values of adjacent pixels within the 2D array of pixels; a quantity of parallel lines within the 2D array of pixels; and an orientation of the quantity of parallel lines.

The transform may include a Saporetti transform.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A decoding device comprising:
 a decoding storage configured to store metadata of each tile of an image of a portion of an object captured by an image sensor of a camera, wherein:
  the image is divided by a subsampling circuit associated with the camera into multiple tiles;
  each tile comprises a two-dimensional (2D) array of pixels of a portion of the image;
  the metadata of each tile is derived by the subsampling circuit from a performance of a transform with grayscale values of the 2D array of pixels; and
  the metadata is descriptive of at least one characteristic of at least a portion of the 2D array of pixels; and
 a processor coupled to the decoding storage, the processor configured to:
  for each tile of the image, compare a metadata value of the corresponding metadata to a first threshold to identify at least one tile of the image that comprises a portion of an indicia that encodes data; and
  in response to an identification of a cluster of adjacent tiles of the image in which the metadata value of each tile of the cluster meets the first threshold, and in which the cluster comprises a quantity of tiles that meets a second threshold:
   transmit a request to the subsampling circuit to provide a region of interest (ROI) of the image that comprises the cluster;
   analyze the ROI to determine whether the ROI contains the indicia; and
   in response to a determination that the ROI contains the indicia:
    interpret the indicia to decode the encoded data; and
    transmit the decoded data to a server via a network.

2. The decoding device of claim 1, wherein:
 the metadata value of the metadata of a tile of the image is selected from the set consisting of:
  a lowest grayscale value among the 2D array of pixels;
  a highest grayscale value among the 2D array of pixels;
  a value indicative of a contrast between grayscale values of adjacent pixels within the 2D array of pixels; and
  a quantity of parallel lines within the 2D array of pixels; and
 the first threshold is selected from a set consisting of:
  a minimum difference between the highest grayscale value and the lowest grayscale value;
  a minimum value for the contrast; and
  a minimum quantity of parallel lines.

3. The decoding device of claim 1, wherein each grayscale value consists of a value selected from the group consisting of:
 a level of intensity of a monochromatic pixel;
 a level of intensity of a color pixel, wherein the grayscale value is accompanied by at least one chrominance value that specifies a color of the color pixel; and
 a level of intensity of a color component of a plurality of color components that cooperate to specify a color of a color pixel.

4. The decoding device of claim 1, wherein the transform comprises a Saporetti transform.

5. The decoding device of claim 1, wherein the identification of the cluster of adjacent tiles further comprises an identification of a 2D array of tiles that meets a third threshold of a minimum quantity of rows occupied by the cluster and a fourth threshold of a minimum quantity of columns occupied by the cluster.

6. The decoding device of claim 1, wherein the identification of the cluster of adjacent tiles further comprises an identification of a plurality of tiles in which each tile includes at least one line that shares a single orientation.

7. The decoding device of claim 1, wherein the request to provide a ROI of the image describes the ROI as a 2D array of tiles.

8. The decoding device of claim 1, wherein the indicia is selected from a group consisting of:
 a one-dimensional (1D) optically readable code; and
 a 2D optically readable code.

9. The decoding device of claim 1, further comprising:
 the subsampling circuit; and
 an image storage accessible to the subsampling circuit, the image storage configured to store a plurality of images that includes the image and that are captured by the image sensor of the camera at a selected frame rate, wherein:
 the subsampling circuit is configured to:
  recurringly refresh the plurality of images to include a predetermined quantity of most recently captured images of the plurality of images;
  divide each image of the plurality of images into multiple tiles;
  perform the transform with each tile to derive metadata from each tile; and
  provide the metadata derived from each tile to the processor;
 the processor is configured to:
  compare the metadata value of the metadata of each tile of each image of the plurality of images to the first threshold to identify at least one of the cluster within at least one image of the plurality of images;
  for each identified cluster:
   transmit a request to the subsampling circuit to provide the corresponding ROI;
   analyze the ROI to determine whether the corresponding ROI contains the indicia; and
   in response to a determination that the corresponding ROI contains the indicia, interpret the indicia to decode the encoded data; and
  in response to a determination that at least one corresponding ROI contains the indicia, transmit the decoded data to the server via the network.

10. The decoding device of claim 1, further comprising:
 a plurality of subsampling circuits that includes the subsampling circuit; and
 at least one image storage accessible to the plurality of subsampling circuits, the at least one image storage configured to store a plurality of images that includes the image and that are captured by image sensors of a plurality of cameras that includes the camera, wherein:

each subsampling circuit of the plurality of subsampling circuits is coupled to a corresponding image sensor of a corresponding camera of the plurality of cameras;
each subsampling circuit is configured to:
divide the corresponding image captured by the image sensor of the corresponding camera into multiple tiles;
derive metadata from each tile; and
provide the metadata derived from each tile to the processor; and
the processor is configured to:
for each image of the plurality of images, compare the metadata value of the metadata of each tile to the first threshold to identify at least one of the cluster within at least one image of the plurality of images;
for each identified cluster:
transmit a request to the corresponding subsampling circuit to provide the corresponding ROI;
analyze the ROI to determine whether the corresponding ROI contains the indicia; and
in response to a determination that the corresponding ROI contains the indicia, interpret the indicia to decode the encoded data; and
in response to a determination that at least one corresponding ROI contains the indicia, transmit the decoded data to the server via the network.

11. The decoding device of claim 10, further comprising a system-on-chip (SOC) integrated circuit, wherein:
the SOC comprises the processor and the plurality of subsampling circuits; and
the decoding storage and the at least one image storage are coupled to the SOC.

12. The decoding device of claim 10, further comprising a network interface configured to couple the processor to the network, wherein each camera of the plurality of cameras is coupled to the network interface via the network.

13. The decoding device of claim 10, wherein:
each camera of the plurality of cameras comprises an image sensor configured to capture an image of the plurality of images within a field of view (FOV) of the camera; and
the FOV of each camera of the plurality of cameras at least partially overlaps the FOV of at least one other camera of the plurality of cameras.

14. The decoding device of claim 13, wherein:
the plurality of cameras are positioned about a location through which the object moves to cause the location to fall within the FOV of each camera of the plurality of cameras; and
the image sensor of each camera of the plurality of cameras captures an image of the plurality of images of a portion of the object as the object is moved through the location.

15. A decoding system comprising:
a camera that comprises an image sensor configured to capture an image of a portion of an object;
a subsampling circuit coupled to the image sensor, the subsampling circuit configured to:
divide the image into multiple tiles, wherein each tile comprises a two-dimensional (2D) array of pixels of a portion of the image; and
for each tile of the image, perform a transform with grayscale values of the 2D array of pixels to derive metadata descriptive of at least one characteristic of at least a portion of the 2D array of pixels; and a processor coupled to the subsampling circuit, the processor configured to:
for each tile of the image, compare a metadata value of the corresponding metadata to a first threshold to identify at least one tile of the image that comprises a portion of an indicia that encodes data; and
in response to an identification of a cluster of adjacent tiles of the image in which the metadata value of each tile of the cluster meets the first threshold, and in which the cluster comprises a quantity of tiles that meets a second threshold:
transmit a request to the subsampling circuit to provide a region of interest (ROI) of the image that comprises the cluster;
analyze the ROI to determine whether the ROI contains the indicia; and
in response to a determination that the ROI contains the indicia:
interpret the indicia to decode the encoded data; and
transmit the decoded data to a server via a network.

16. The decoding system of claim 15, further comprising a plurality of cameras that includes the camera, wherein each camera of the plurality of cameras comprises an image sensor configured to capture an image of a plurality of images that includes the image and that is within a field of view (FOV) of the camera.

17. The decoding system of claim 16, wherein the plurality of cameras are incorporated into a camera array device.

18. The decoding system of claim 16, wherein:
each camera of the plurality of cameras is positioned about a location through which the object moves to cause the location to fall within the FOV of each camera of the plurality of cameras; and
the image sensor of each camera of the plurality of cameras captures an image of the plurality of images of the object as the object is moved through the location.

19. The decoding system of claim 16, further comprising a plurality of subsampling circuits that includes the subsampling circuit, wherein:
each subsampling circuit of the plurality of subsampling circuits is coupled to the image sensor of a corresponding camera of the plurality of cameras;
each subsampling circuit is configured to:
divide the corresponding image captured by the corresponding camera into multiple tiles;
perform the transform to with each tile to derive metadata from each tile; and
provide the metadata derived from each tile to the processor; and
the processor is configured to:
compare the metadata value of the metadata of each tile of each image of the plurality of images to the first threshold to identify at least one of the cluster within at least one image of the plurality of images;
for each identified cluster:
transmit a request to the corresponding subsampling circuit to provide the corresponding ROI;
analyze the ROI to determine whether the corresponding ROI contains the indicia; and
in response to a determination that the corresponding ROI contains the indicia, interpret the indicia to decode the encoded data; and in response to a determination that at least one corresponding ROI contains the indicia, transmit the decoded data to the server via the network.

20. The decoding system of claim 19, further comprising a decoding device, wherein:
the decoding device comprises:
the plurality of subsampling circuits;
an image storage accessible to the plurality of sub sampling circuits, the image storage configured to store the plurality of images that include the image and that are captured by the image sensors of the plurality of cameras;
the processor; and
a decoding storage accessible to the processor, the decoding storage configured to store the metadata of each tile of each image of the plurality of images; and
each subsampling circuit is coupled to the image sensor of a corresponding camera of the plurality of cameras through a corresponding coupling between the decoding device and each camera of the plurality of cameras.

21. The decoding system of claim 20, further comprising a system-on-chip (SOC) integrated circuit, wherein:
the SOC comprises the processor and the plurality of subsampling circuits; and
the decoding storage and the image storage are coupled to the SOC.

22. The decoding system of claim 19, wherein each camera of the plurality of cameras comprises:
the corresponding subsampling circuit of the plurality of subsampling circuits that is coupled to the image sensor of the camera; and
an image storage accessible to the corresponding subsampling circuit, the image storage configured to store the image of the plurality of images that is captured by the image sensor.

23. The decoding system of claim 22, further comprising a decoding device, wherein:
the decoding device comprises:
the processor; and
a decoding storage accessible to the processor, the decoding storage configured to store the metadata of each tile of each image of the plurality of images; and
the processor is coupled to each subsampling circuit of the plurality of subsampling circuits through a corresponding coupling between the decoding device and each camera of the plurality of cameras.

24. The decoding system of claim 23, wherein the decoding device is coupled to the plurality of cameras via the network.

25. The decoding system of claim 15, wherein the transform comprises a Saporetti transform.

26. The decoding system of claim 15, wherein the metadata value of the metadata of a tile of the image is selected from the set consisting of:
a lowest grayscale value among the 2D array of pixels;
a highest grayscale value among the 2D array of pixels;
a value indicative of a contrast between grayscale values of adjacent pixels within the 2D array of pixels;
a quantity of parallel lines within the 2D array of pixels; and
an orientation of the quantity of parallel lines.

* * * * *